United States Patent
Okazaki

(10) Patent No.: US 10,877,197 B2
(45) Date of Patent: Dec. 29, 2020

(54) OPTICAL COMPENSATION DEVICE, LIQUID CRYSTAL DISPLAY UNIT, AND PROJECTION DISPLAY APPARATUS

(71) Applicant: SONY CORPORATION, Tokyo (JP)

(72) Inventor: Tsuyoshi Okazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,659

(22) PCT Filed: Jul. 18, 2017

(86) PCT No.: PCT/JP2017/025899
§ 371 (c)(1),
(2) Date: Feb. 6, 2019

(87) PCT Pub. No.: WO2018/042912
PCT Pub. Date: Mar. 8, 2018

(65) Prior Publication Data
US 2019/0170923 A1   Jun. 6, 2019

(30) Foreign Application Priority Data
Aug. 30, 2016 (JP) .................. 2016-167881

(51) Int. Cl.
*G02B 5/30* (2006.01)
*G02F 1/13363* (2006.01)
(Continued)

(52) U.S. Cl.
CPC ......... *G02B 5/3041* (2013.01); *G02B 5/3083* (2013.01); *G02F 1/13363* (2013.01); *G02F 1/133528* (2013.01); *G03B 21/00* (2013.01)

(58) Field of Classification Search
None
See application file for complete search history.

(56) References Cited

U.S. PATENT DOCUMENTS

| 6,396,630 B1 | 5/2002 | Stiens et al. |
| 2007/0070276 A1* | 3/2007 | Tan ............. G02B 5/3083 349/117 |
| 2018/0045876 A1* | 2/2018 | Lee ............. G02B 6/0053 |

FOREIGN PATENT DOCUMENTS

| JP | 2006-011298 A | 1/2006 |
| JP | 2007-011206 A | 1/2007 |

(Continued)

OTHER PUBLICATIONS

International Search Report and Written Opinion of PCT Application No. PCT/JP2017/025899, dated Oct. 24, 2017, 09 pages of ISRWO.

*Primary Examiner* — Ryan Crockett
(74) *Attorney, Agent, or Firm* — Chip Law Group

(57) ABSTRACT

This liquid crystal display unit includes a pair of polarizers, a liquid crystal display device provided between the pair of polarizers, and an optical compensation device provided between, of the pair of polarizers, at least one polarizer and the liquid crystal display device. The optical compensation device includes an underlayer including a plurality of structures that each include first and second surfaces having different inclination angles from each other, and a multilayered film formed on the underlayer and including a plurality of first and second refractive index films that are alternately stacked one on top of another repeatedly. An array pitch of the plurality of structures in the underlayer is smaller than a wavelength of visible light.

20 Claims, 16 Drawing Sheets

(51) Int. Cl.
*G03B 21/00* (2006.01)
*G02F 1/1335* (2006.01)

(56) References Cited

FOREIGN PATENT DOCUMENTS

| | | |
|---|---|---|
| JP | 2007-052218 A | 3/2007 |
| JP | 2008-145816 A | 6/2008 |
| JP | 2010-156896 A | 7/2010 |
| JP | 2013-174649 A | 9/2013 |
| WO | 2008/081919 A1 | 7/2008 |

* cited by examiner

[FIG. 1]
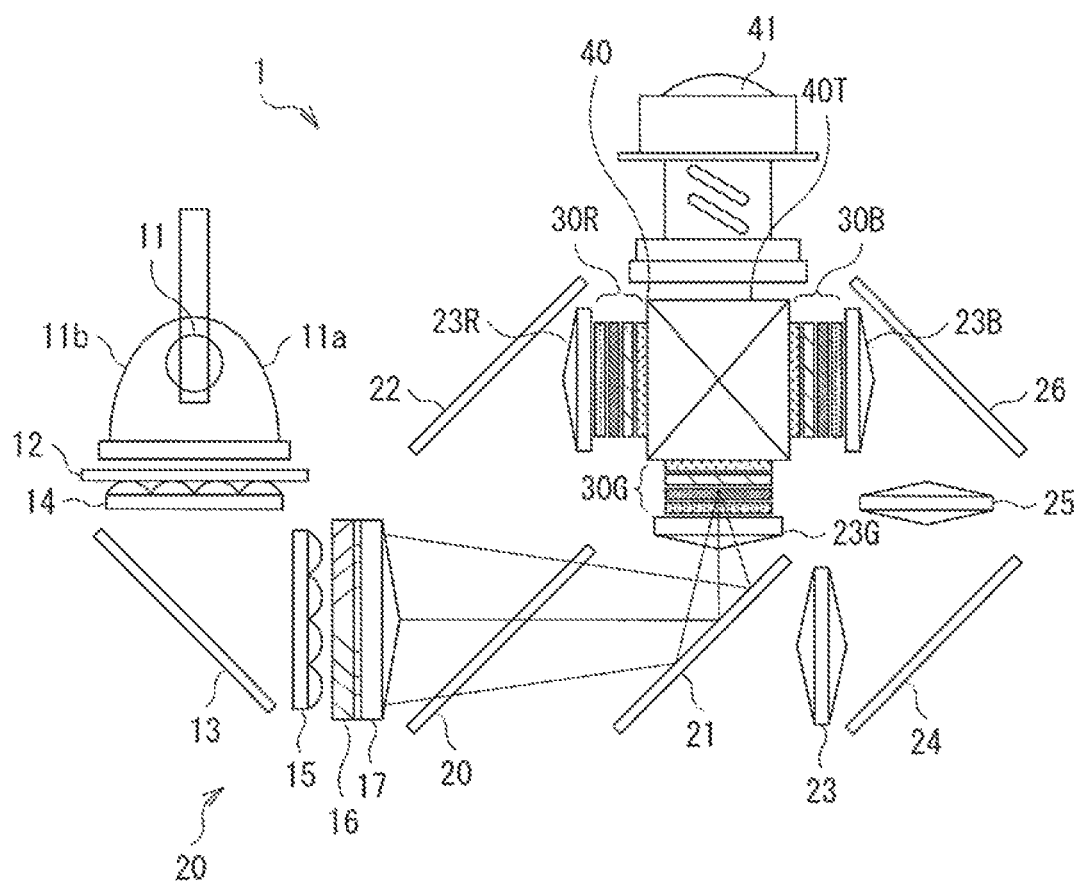
[FIG. 2]
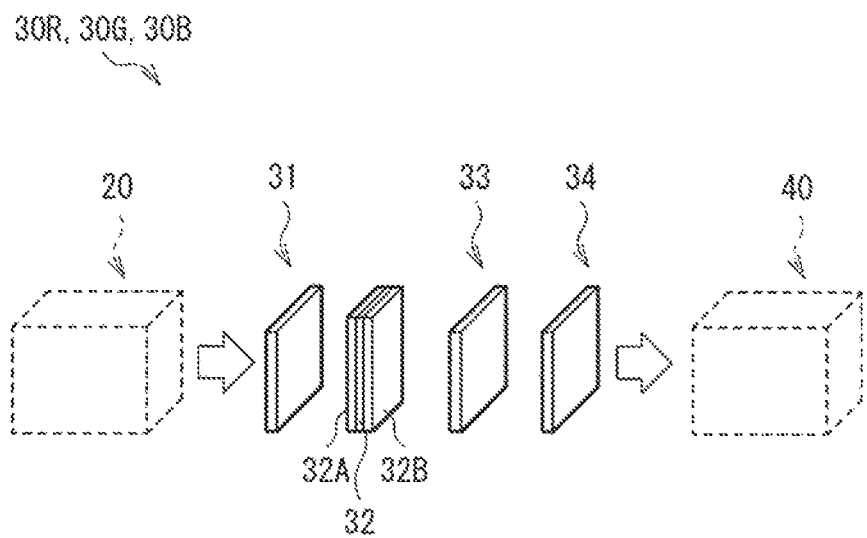

[FIG. 3]
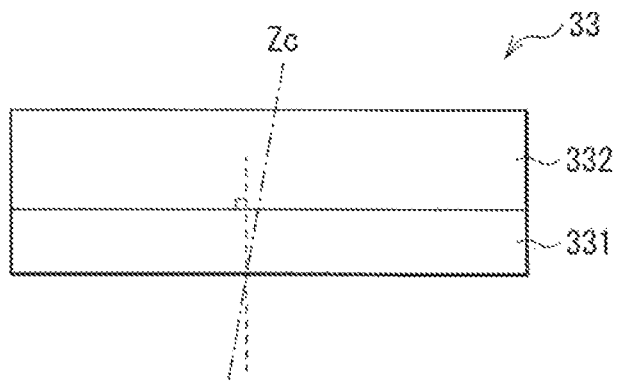
[FIG. 4A]
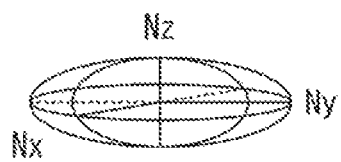
[FIG. 4B]
[FIG. 5]
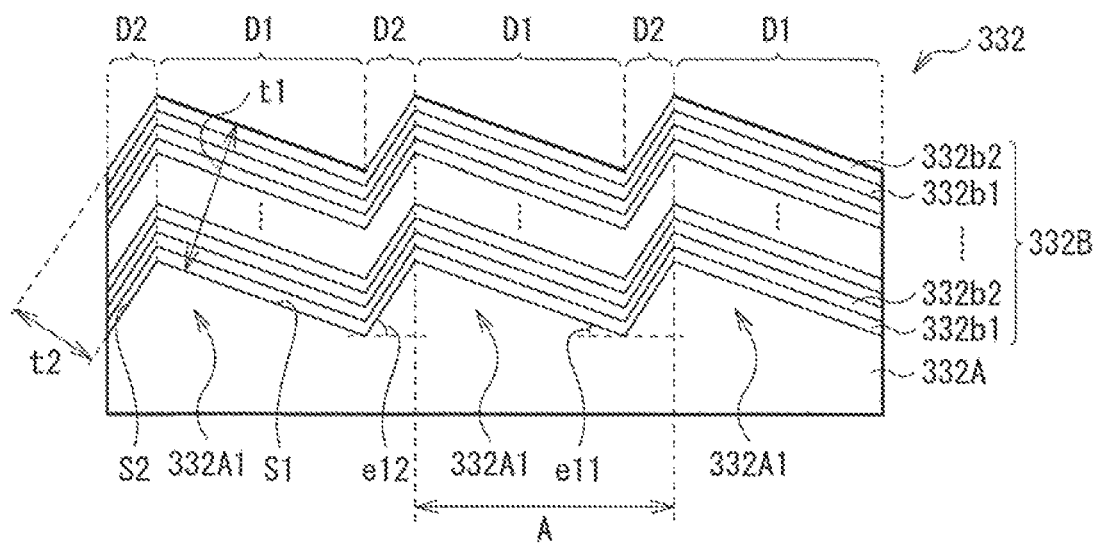

[FIG. 6]
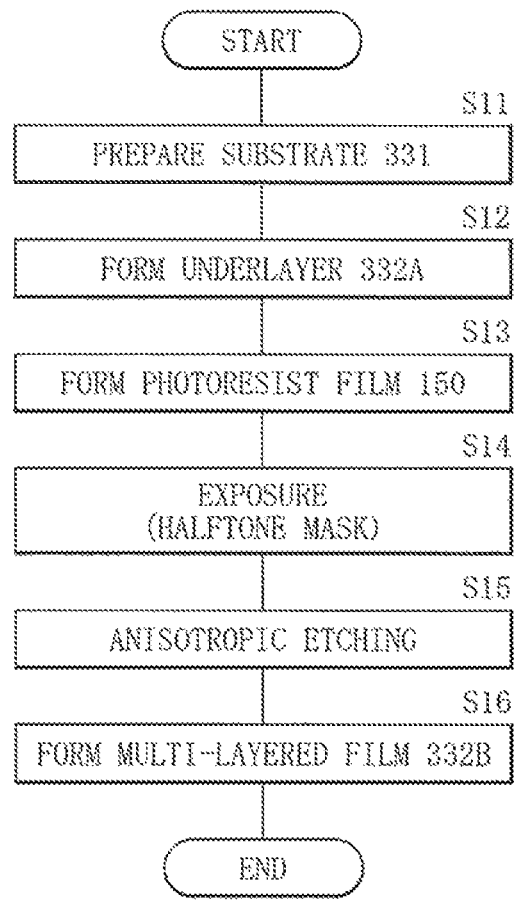

[FIG. 7A]
[FIG. 7B]
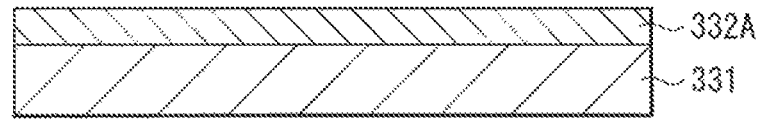
[FIG. 7C]
[FIG. 7D]
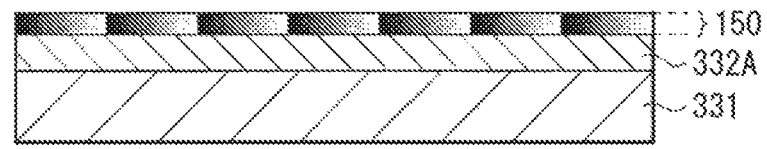
[FIG. 7E]
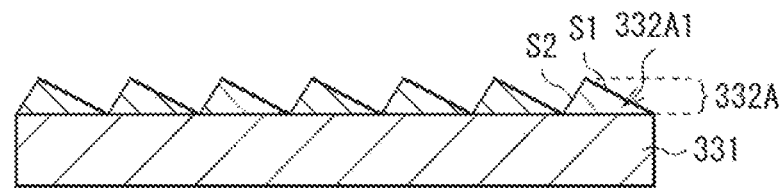
[FIG. 7F]
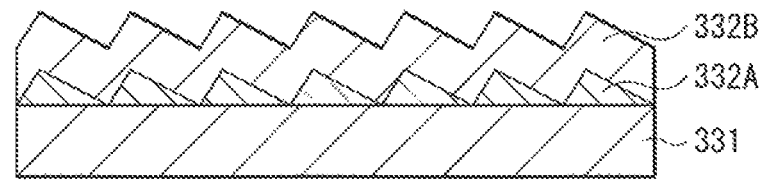

[ FIG. 8A ]
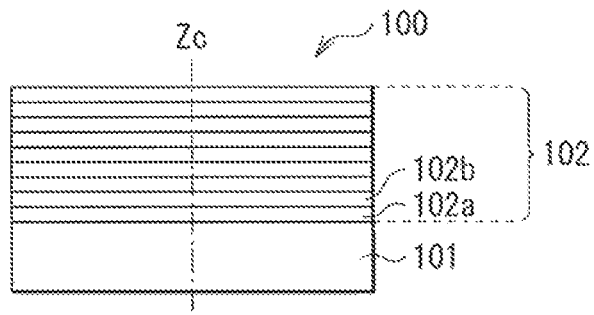
[ FIG. 8B ]
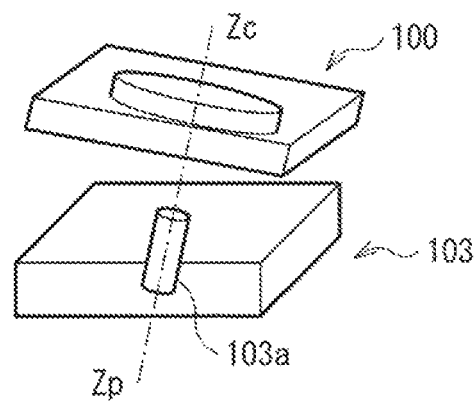
[ FIG. 9A ]
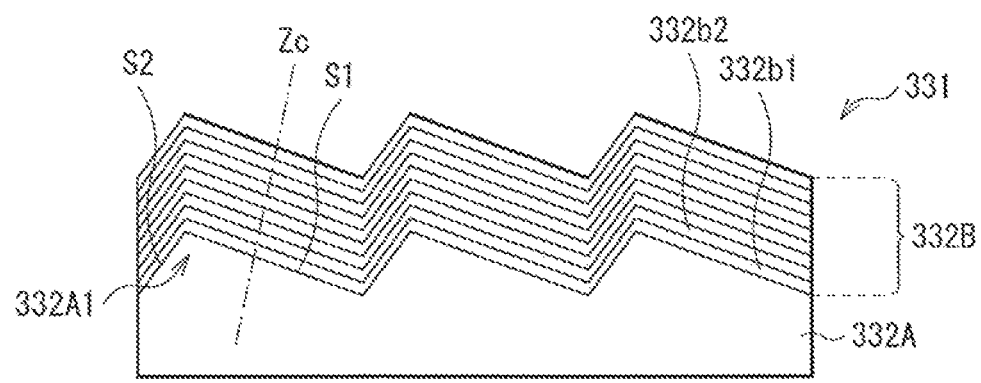
[ FIG. 9B ]
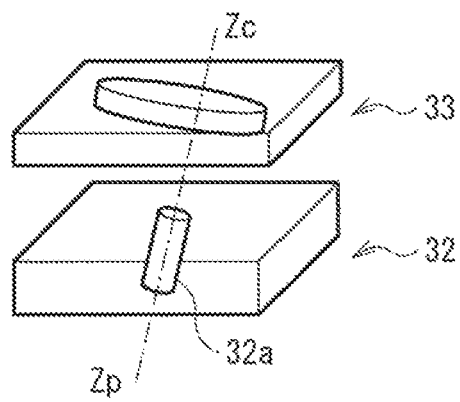

[ FIG. 10 ]
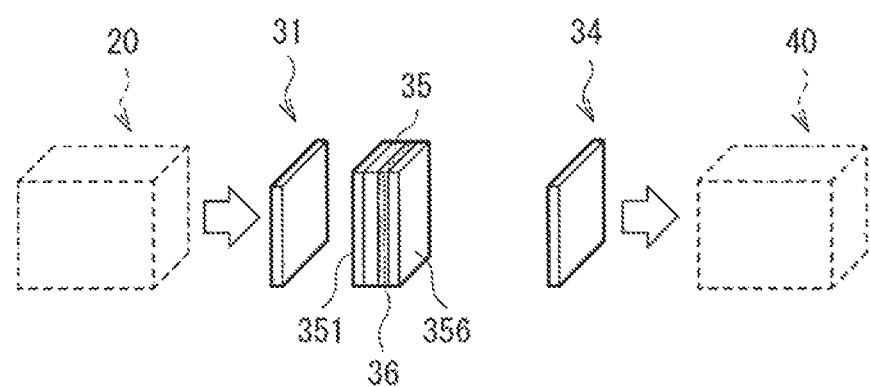

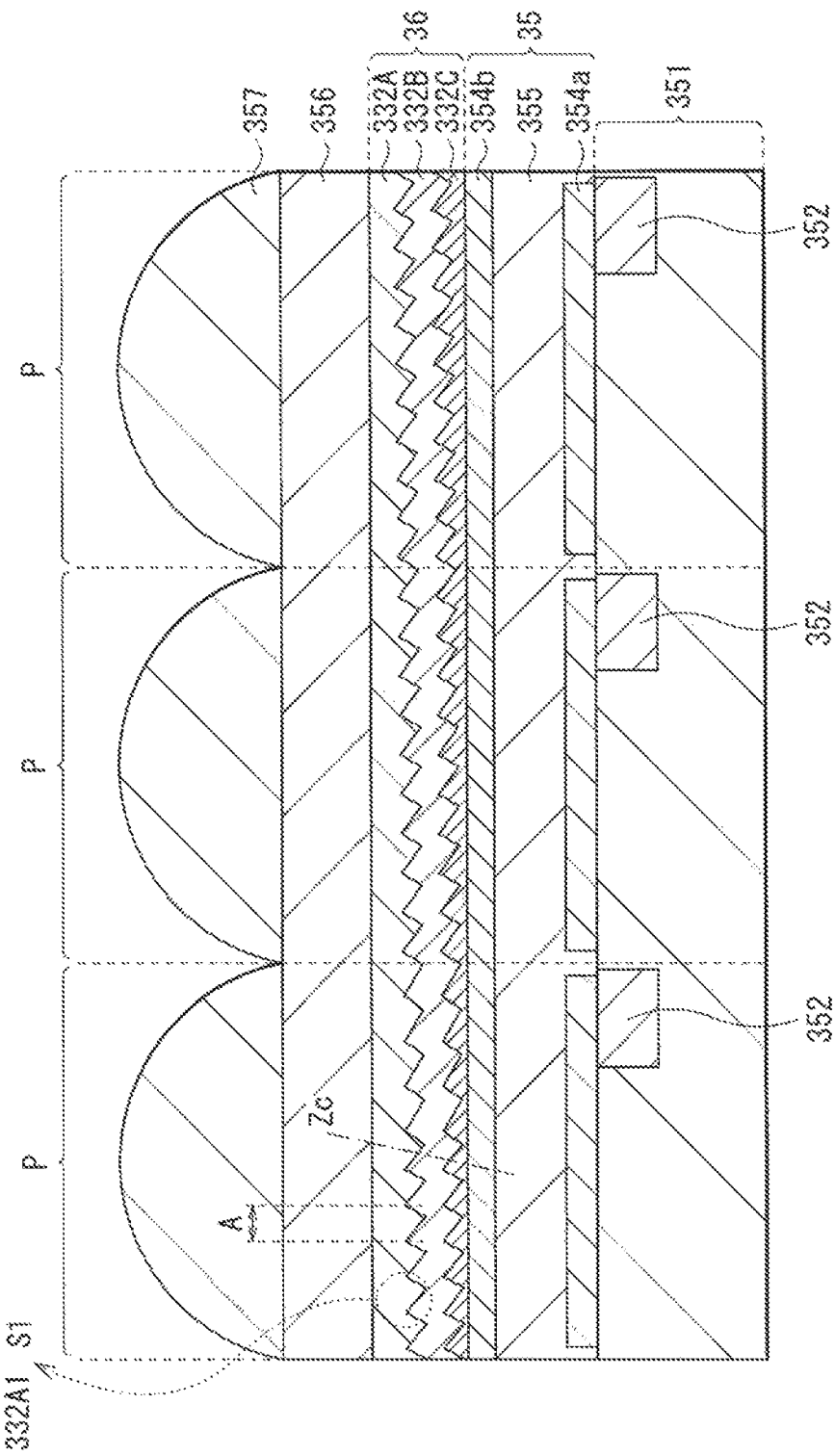
[FIG. 11]

[ FIG. 12 ]
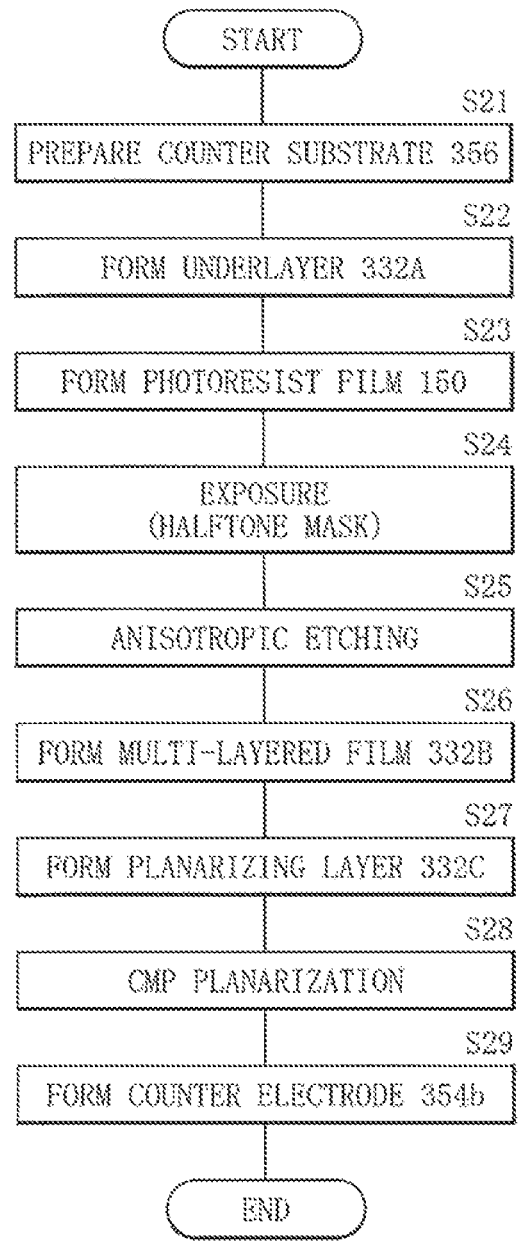

[ FIG. 13A ]
[ FIG. 13B ]
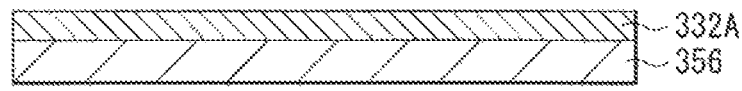
[ FIG. 13C ]
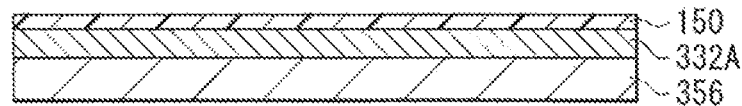
[ FIG. 13D ]
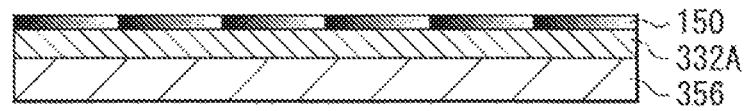
[ FIG. 13E ]
[ FIG. 13F ]

[ FIG. 13G ]
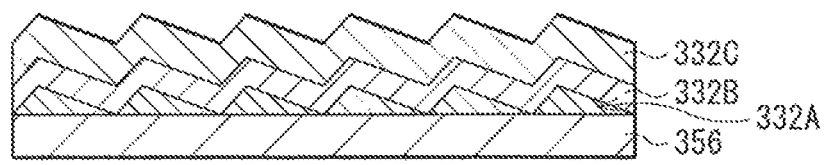
[ FIG. 13H ]
[ FIG. 13I ]
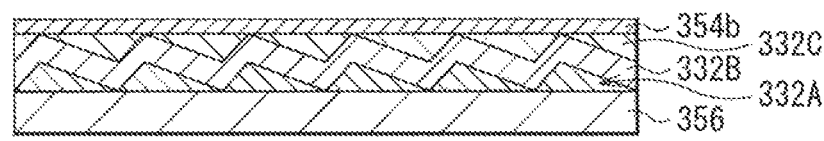

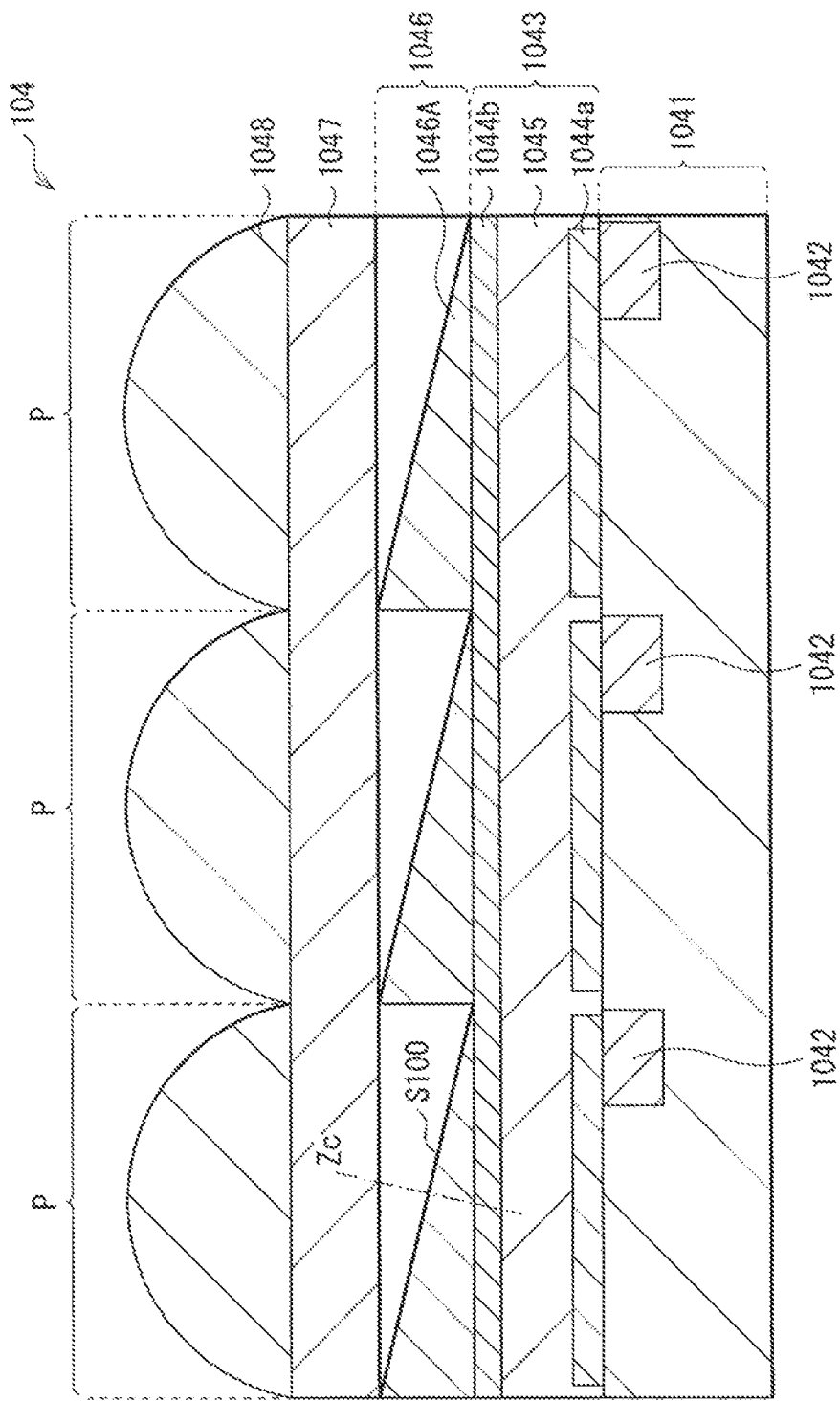
[FIG. 14]

[FIG. 15]
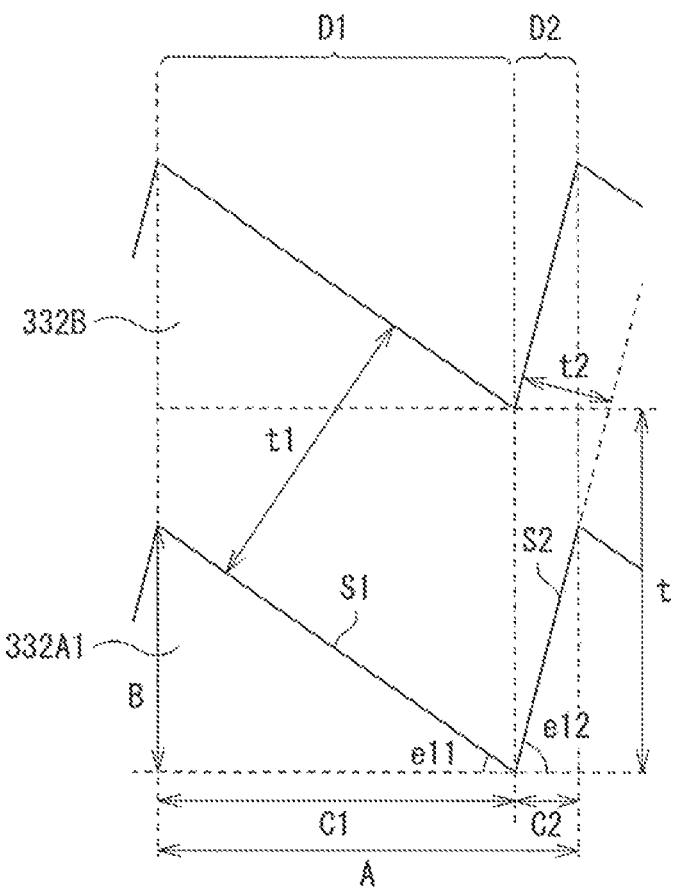
[FIG. 16]
| ARRAY PITCH | A | 300nm |
|---|---|---|
| HEIGHT | B | 150nm |
| LENGTH OF BASE | C1 | 250nm |
| | C2 | 50nm |
| INCLINATION ANGLE | e11 | 36.9° |
| | e12 | 56.3° |
| FILM THICKNESS | t | 4800nm |
| | t1 | 3840nm |
| | t2 | 2663nm |

[ FIG. 17A ]
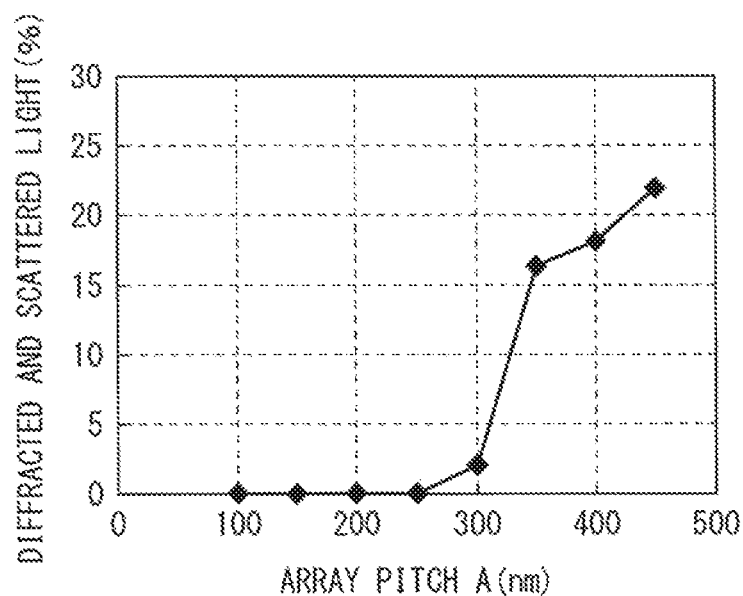
[ FIG. 17B ]
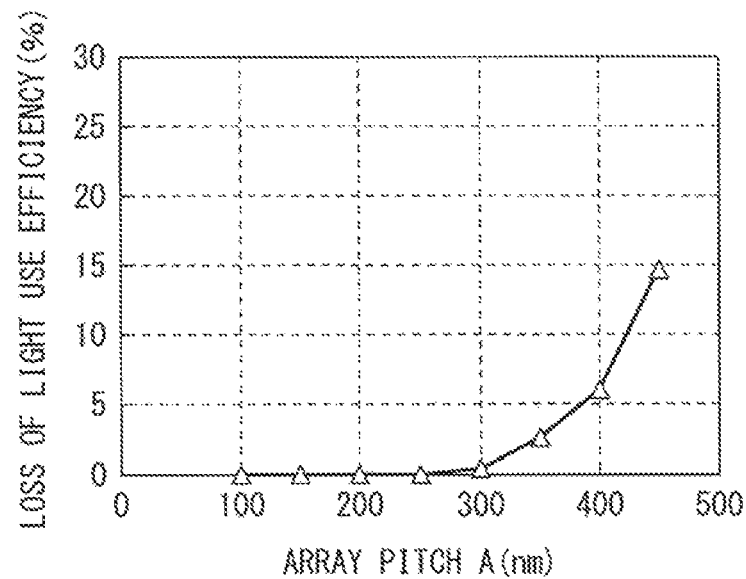

[ FIG. 18 ]
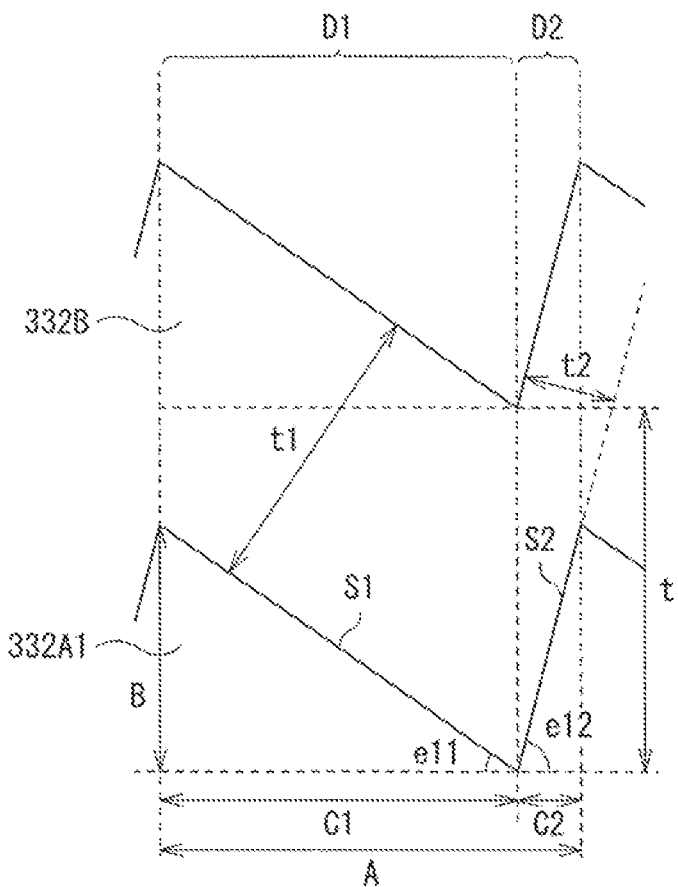
[ FIG. 19 ]
| ARRAY PITCH | A | 300nm |
|---|---|---|
| HEIGHT | B | 150nm |
| LENGTH OF BASE | C1 | 250nm |
| | C2 | 50nm |
| INCLINATION ANGLE | e11 | 31.0° |
| | e12 | 71.6° |
| FILM THICKNESS | t | 3600nm |
| | t1 | 3087nm |
| | t2 | 1138nm |

[ FIG. 20A ]
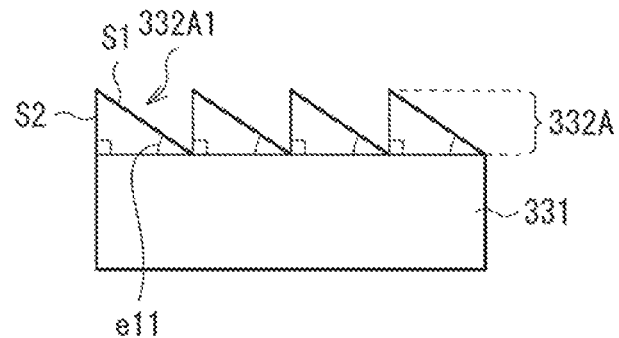
[ FIG. 20B ]
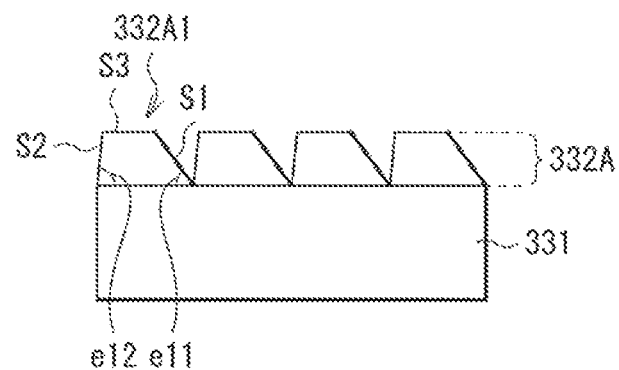
[ FIG. 20C ]
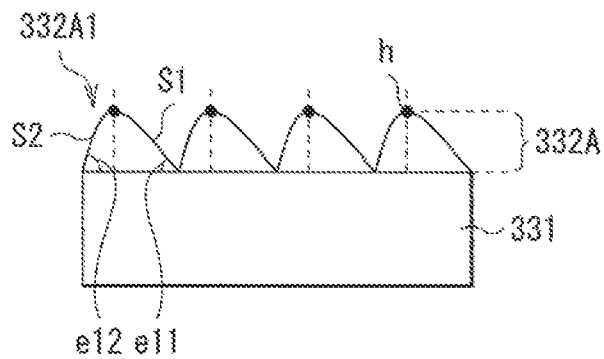
[ FIG. 20D ]
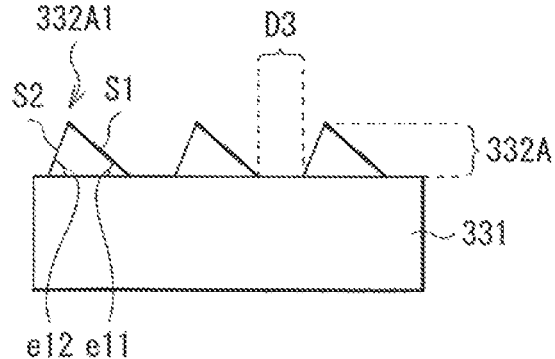

[ FIG. 21A ]
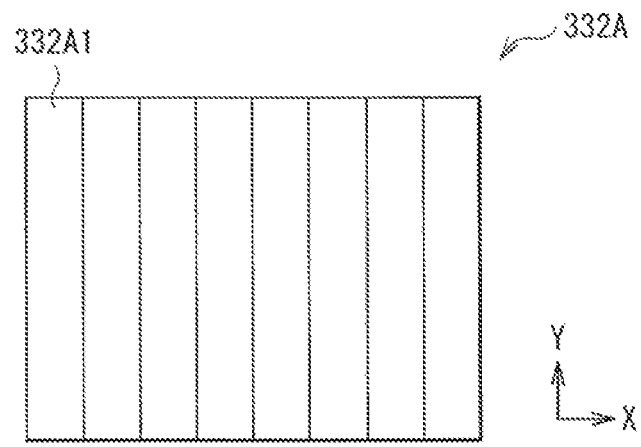
[ FIG. 21B ]
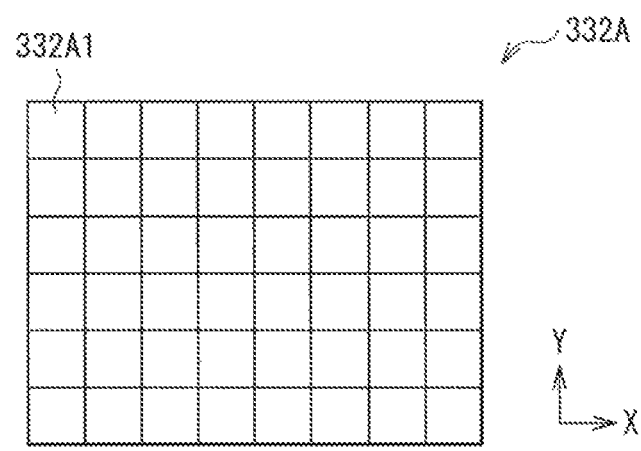
[ FIG. 22 ]
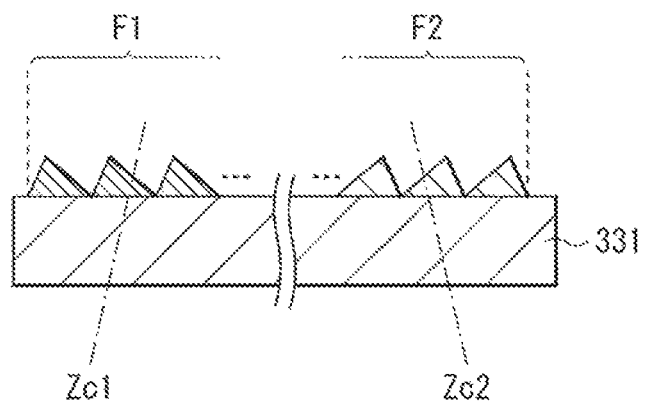

OPTICAL COMPENSATION DEVICE, LIQUID CRYSTAL DISPLAY UNIT, AND PROJECTION DISPLAY APPARATUS

CROSS REFERENCE TO RELATED APPLICATIONS

This application is a U.S. National Phase of International Patent Application No. PCT/JP2017/025899 filed on Jul. 18, 2017, which claims priority benefit of Japanese Patent Application No. JP 2016-167881 filed in the Japan Patent Office on Aug. 30, 2016. Each of the above-referenced applications is hereby incorporated herein by reference in its entirety.

TECHNICAL FIELD

The present disclosure relates to an optical compensation device and a liquid crystal display unit including the same, and a projection display apparatus using this liquid crystal display unit.

BACKGROUND ART

In recent years, vertical alignment (VA mode) liquid crystal has become the mainstream of liquid crystal used in a liquid crystal panel of a projection display apparatus, such as a liquid crystal projector. In this liquid crystal display unit, for example, an optical compensator that compensates residual retardation when a black screen is displayed is used.

Such optical compensators include, for example, an O-plate including liquid crystal polymer (PTL 1) and a negative C-plate (PTLs 2 to 4).

CITATION LIST

Patent Literature

PTL 1: International Publication WO 2008/081919
PTL 2: Japanese Unexamined Patent Application Publication No. 2006-11298
PTL 3: Japanese Unexamined Patent Application Publication No. 2008-145816
PTL 4: Japanese Unexamined Patent Application Publication No. 2007-52218

SUMMARY OF THE INVENTION

A liquid crystal display unit using an optical compensator (an optical compensation device), such as the one described above, is expected to achieve high luminance and a high contrast ratio.

A liquid crystal display unit in an embodiment of the present disclosure includes a pair of polarizers, a liquid crystal display device provided between the pair of polarizers, and an optical compensation device provided between, of the pair of polarizers, at least one polarizer and the liquid crystal display device. The optical compensation device includes: an underlayer including a plurality of structures that each include first and second surfaces having different inclination angles from each other; and a multilayered film formed on the underlayer and including a plurality of first and second refractive index films alternately stacked one on top of another repeatedly, in which an array pitch of the plurality of structures in the underlayer is smaller than a wavelength of visible light.

A projection display apparatus in an embodiment of the present disclosure includes the above-described liquid crystal display unit in the embodiment of the present disclosure.

In the liquid crystal display unit and the projection display apparatus in the embodiments of the present disclosure, the optical compensation device provided between, of the pair of polarizers, at least one polarizer and the liquid crystal display device includes the underlayer including the plurality of structures that each include the first and second surfaces having different inclination angles from each other. On top of this underlayer, the multilayered film including the plurality of first and second refractive index films alternately stacked one on top of another repeatedly is formed, thereby the optical compensation device serves as a negative C-plate with the optical axis tilted, and is able to compensate residual retardation of the liquid crystal display device. As the array pitch of the plurality of structures in the underlayer beneath this multilayered film is smaller than the wavelength of visible light, the influence of diffraction on the optical compensation device is suppressed, and light loss is reduced.

An optical compensation device in an embodiment of the present disclosure includes: an underlayer including a plurality of structures that each include first and second surfaces having different inclination angles from each other; and a multilayered film formed on the underlayer and including a plurality of first and second refractive index films alternately stacked one on top of another repeatedly, in which an array pitch of the plurality of structures in the underlayer is smaller than a wavelength of visible light.

The optical compensation device in the embodiment of the present disclosure includes the underlayer including the plurality of structures that each include the first and second surfaces having different inclination angles from each other, and on top of this underlayer, the multilayered film including the plurality of first and second refractive index films alternately stacked one on top of another repeatedly is formed. Accordingly, the optical compensation device serves as a negative C-plate with the optical axis tilted, and is able to compensate residual retardation of the liquid crystal display device. As the array pitch of the plurality of structures in the underlayer beneath this multilayered film is smaller than the wavelength of visible light, the influence of diffraction is suppressed, and light loss is reduced.

According to the liquid crystal display unit and the projection display apparatus in the embodiments of the present disclosure, the optical compensation device provided between, of the pair of polarizers, at least one polarizer and the liquid crystal display device includes the underlayer including the plurality of structures that each include the first and second surfaces having different inclination angles from each other. On top of this underlayer, the multilayered film including the plurality of first and second refractive index films alternately stacked one on top of another repeatedly is formed; therefore, it is possible to compensate residual retardation of the liquid crystal display device. By making the array pitch of the plurality of structures in the underlayer beneath this multilayered film smaller than the wavelength of visible light, which makes it possible to reduce light loss and to increase luminance. Consequently, it becomes possible to achieve high luminance and a high contrast ratio.

The optical compensation device in the embodiments of the present disclosure includes the underlayer including the plurality of structures that each include the first and second surfaces having different inclination angles from each other, and on top of this underlayer, the multilayered film including the plurality of first and second refractive index films alternately stacked one on top of another repeatedly is formed. Accordingly, it is possible to compensate residual retardation of the liquid crystal display device. By making the array pitch of the plurality of structures in the underlayer beneath this multilayered film smaller than the wavelength of visible light, which makes it possible to reduce light loss. In a liquid crystal display unit including this optical compensation device, it becomes possible to achieve high luminance and a high contrast ratio.

It is to be noted that the effects described here are not necessarily limited to those described above, and may be any effect described in the present disclosure.

BRIEF DESCRIPTION OF DRAWINGS

FIG. 1 is a diagram illustrating an overall configuration example of a projection display apparatus using a liquid crystal display unit according to a first embodiment of the present disclosure.

FIG. 2 is a schematic diagram illustrating a configuration example of the liquid crystal display unit illustrated in FIG. 1.

FIG. 3 is a schematic diagram illustrating a configuration example of an optical compensator illustrated in FIG. 2.

FIG. 4A is a schematic diagram illustrating an index ellipsoid.

FIG. 4B is a schematic diagram that describes an optical axis of a negative C-plate.

FIG. 5 is a schematic cross-sectional view illustrating an example of a layered structure illustrated in FIG. 3.

FIG. 6 is a flowchart that describes a method of forming the optical compensator illustrated in FIG. 3.

FIG. 7A is a schematic cross-sectional view illustrating one step of the method of forming the optical compensator illustrated in FIG. 3.

FIG. 7B is a schematic cross-sectional view illustrating a step subsequent to FIG. 7A.

FIG. 7C is a schematic cross-sectional view illustrating a step subsequent to FIG. 7B.

FIG. 7D is a schematic cross-sectional view illustrating a step subsequent to FIG. 7C.

FIG. 7E is a schematic cross-sectional view illustrating a step subsequent to FIG. 7D.

FIG. 7F is a schematic cross-sectional view illustrating a step subsequent to FIG. 7E.

FIG. 8A is a schematic cross-sectional view illustrating a configuration of an optical compensator according to Comparative Example 1.

FIG. 8B is a schematic diagram that describes workings of the optical compensator illustrated in FIG. 8A.

FIG. 9A is a schematic cross-sectional view illustrating a configuration of the optical compensator illustrated in FIG. 3.

FIG. 9B is a schematic diagram that describes workings of the optical compensator illustrated in FIG. 9A.

FIG. 10 is a schematic diagram illustrating a configuration example of a liquid crystal display unit according to a second embodiment of the present disclosure.

FIG. 11 is a schematic cross-sectional view of a main section that describes an optical compensation layer illustrated in FIG. 10.

FIG. 12 is a flowchart that describes a method of forming the optical compensation layer illustrated in FIG. 11.

FIG. 13A is a schematic cross-sectional view illustrating one step when the optical compensation layer illustrated in FIG. 11 is formed.

FIG. 13B is a schematic cross-sectional view illustrating a step subsequent to FIG. 13A.

FIG. 13C is a schematic cross-sectional view illustrating a step subsequent to FIG. 13B.

FIG. 13D is a schematic cross-sectional view illustrating a step subsequent to FIG. 13C.

FIG. 13E is a schematic cross-sectional view illustrating a step subsequent to FIG. 13D.

FIG. 13F is a schematic cross-sectional view illustrating a step subsequent to FIG. 13E.

FIG. 13G is a schematic cross-sectional view illustrating a step subsequent to FIG. 13F.

FIG. 13H is a schematic cross-sectional view illustrating a step subsequent to FIG. 13G.

FIG. 13I is a schematic cross-sectional view illustrating a step subsequent to FIG. 13H.

FIG. 14 is a schematic cross-sectional view illustrating a configuration of a liquid crystal panel according to Comparative Example 2.

FIG. 15 is a diagram illustrating a configuration example of a main section of an optical compensator according to Example 1.

FIG. 16 is a table illustrating design values of the optical compensator illustrated in FIG. 15.

FIG. 17A is a characteristic diagram illustrating a ratio of diffracted light to an array pitch.

FIG. 17B is a characteristic diagram illustrating loss of light use efficiency to the array pitch.

FIG. 18 is a diagram illustrating a configuration example of a main section of an optical compensation layer according to Example 2.

FIG. 19 is a table illustrating design values of the optical compensation layer illustrated in FIG. 18.

FIG. 20A is a schematic diagram that describes a configuration of an optical compensator according to Modification Example 1-1.

FIG. 20B is a schematic diagram that describes a configuration of an optical compensator according to Modification Example 1-2.

FIG. 20C is a schematic diagram that describes a configuration of an optical compensator according to Modification Example 1-3.

FIG. 20D is a schematic diagram that describes a configuration of an optical compensator according to Modification Example 1-4.

FIG. 21A is a schematic diagram that describes an example of arrangement of structures in an underlayer.

FIG. 21B is a schematic diagram that describes an example of arrangement of the structures in the underlayer.

FIG. 22 is a schematic diagram that describes a configuration of an optical compensator according to another modification example.

MODES FOR CARRYING OUT THE INVENTION

In the following, some embodiments of the present disclosure will be described in detail with reference to drawings. It is to be noted that description is made in the following order:

1. First Embodiment (An example of a liquid crystal display unit provided with an optical compensator between a liquid crystal panel and a polarizer, and a projection display apparatus)

2. Second Embodiment (An example of a liquid crystal display unit provided with an optical compensation layer in a liquid crystal panel)

3. Modification Examples 1-1 to 1-4 (Other examples of a structural shape of an underlayer)

First Embodiment

[Configuration]

FIG. 1 illustrates an overall configuration example of a projection display apparatus (a projection display apparatus 1) according to a first embodiment of the present disclosure. This projection display apparatus 1 is, for example, a transmissive 3-chip liquid crystal projector, and includes a light source 11, an illumination optical system 20, liquid crystal display units 30R, 30G, and 30B, a color synthesizing prism 40, and a projection lens unit 41.

The light source 11 is configured to emit white light including red, green, and blue light that are three primary colors of light required to project a full-color image. The light source 11 includes, for example, a light emitter 11a that emits white light and a reflector 11b that reflects light emitted from the light emitter 11a. As the light emitter 11a of the light source 11, a discharge lamp filled with gas containing a mercury component, for example, an extra-high pressure mercury lamp or the like is used. The reflector 11b of the light source 11 is a concave mirror, and its mirror surface has a shape having improved circumferential efficiency. Furthermore, the reflector 11b has, for example, a shape of a surface of rotation symmetry, such as a paraboloid of revolution or an ellipsoid of revolution.

The illumination optical system 20 includes, for example, a cut-off filter 12 that cuts off light outside the visible region, first and second multi-lens arrays 14 and 15, a PS synthetic resin 16 for polarizing light from the second multi-lens array 15 in a predetermined polarization direction, a condenser lens 17 that condenses light having passed through the PS synthetic resin 16, and a first dichroic mirror 20 that separates light on the basis of wavelength bands in order along a light path of light emitted from the light source 11.

The cut-off filter 12 is a plane mirror that reflects light in the ultraviolet region included in white light emitted from the light source 11, thereby removing the light in the ultraviolet region. The cut-off filter 12 is, for example, configured such that a glass substrate is coated with a coating that reflects light in the ultraviolet region, and transmits light in a region other than the ultraviolet region.

The first and second multi-lens arrays 14 and 15 are, for example, configured such that a plurality of lens cells each having a similar external shape with an aspect ratio approximately equal to that of an effective pixel region of a liquid crystal display device 25 are arranged in an array. A first turning mirror 13 that reflects light is disposed between the first and second multi-lens arrays 14 and 15. The first and second multi-lens arrays 14 and 15 make light into a beam of light having a shape of effective area of a liquid crystal display device 32 to be described later and homogenize an illuminance distribution in order to uniformly illuminate an effective pixel region of the liquid crystal display device 32. The first fly-eye lens 14 uses its lens cells to concentrate the light reflected by the first turning mirror 13 into small point sources of light, and the second multi-lens array 15 synthesizes pieces of illumination light from the point sources.

The condenser lens 17 is a convex lens, and adjusts a spot diameter of light controlled to be in the predetermined polarization direction by the PS synthetic resin 16 so that the effective pixel region of the liquid crystal display device 32 is efficiently irradiated with the light.

The first dichroic mirror 20 is a wavelength-selective mirror whose main surface of a glass substrate, etc., is coated with layers of dielectric films, which is called dichroic coating. The first dichroic mirror 20 separates light into red light that is caused to be reflected and other color light, i.e., green light and blue light that are caused to be transmitted. Specifically, the first dichroic mirror 20 is provided at a 45° tilt in a direction perpendicular to a light path of light entering from the condenser lens 17 so that, of the light entering from the condenser lens 17, blue light and green light are caused to transmit the first dichroic mirror 20, and red light is reflected by the first dichroic mirror 20 and changes direction by 90°.

The illumination optical system 20 further includes, for example, a second turning mirror 22 that totally reflects light, a first field lens 23R, and the liquid crystal display unit 30R in order along a light path of red light separated by the first dichroic mirror 20.

The second turning mirror 22 is a total reflection mirror that reflects light reflected by the first dichroic mirror 20 and changes its direction by 90°, and is provided at a 45° tilt in a direction perpendicular to a light path of the reflected red light. Accordingly, the second turning mirror 22 reflects this red light toward the first field lens 23R. The first field lens 23R is a converging lens, and outputs the red light reflected by the second turning mirror 22 toward the liquid crystal display unit 30R and also converges the red light on the liquid crystal display device 32 in the liquid crystal display unit 30R. A configuration of the liquid crystal display unit 30R will be described later.

The illumination optical system 20 further includes, for example, a second dichroic mirror 21 that separates incident light on the basis of wavelength bands, along a light path of the blue and green light separated by the first dichroic mirror 20.

The second dichroic mirror 21 separates incident light into blue light and other color light, i.e., green light. The second dichroic mirror 21 is provided at a 45° tilt in a direction perpendicular to a light path of light entering from the first dichroic mirror 20 so that, of the light entering from the first dichroic mirror 20, blue light is caused to transmit the second dichroic mirror 21, and green light is reflected by the second dichroic mirror 21 and is caused to change its direction by 90°.

The illumination optical system 20 further includes, for example, a second field lens 23G and the liquid crystal display unit 30G in order along a light path of green light separated by the second dichroic mirror 21.

The second field lens 23G is a converging lens, and outputs green light reflected by the second dichroic mirror 21 toward the liquid crystal display unit 30G and also converges the green light on the liquid crystal display device 32 in the liquid crystal display unit 30G. A configuration of the liquid crystal display unit 30G will be described later.

The illumination optical system 20 further includes, for example, a first relay lens 23, a third turning mirror 24 that totally reflects incident light, a second relay lens 25, a fourth turning mirror 26 that totally reflects incident light, a third field lens 23B, and the liquid crystal display unit 30B in order along a light path of blue light separated by the second dichroic mirror 21.

The first relay lens 23 is a lens for adjusting a light path length together with the second relay lens 25, and leads blue light separated by the second dichroic mirror 21 to the third turning mirror 34. The third turning mirror 24 is a total reflection mirror that reflects light from the first relay lens 23 and changes its direction by 90°, and is provided at a 45° tilt in a direction perpendicular to a light path of the blue light from the first relay lens 23. Accordingly, the third turning mirror 34 reflects the blue light from the first relay lens 23 toward the second relay lens 25. The second relay lens 25 is a lens for adjusting the light path length together with the first relay lens 23, and leads the blue light reflected by the third turning mirror 24 to the fourth turning mirror 36.

It is to be noted that since the light path of blue light to the liquid crystal display unit 30B is longer than the light path of red light to the liquid crystal display unit 30R and the light path of green light to the liquid crystal display unit 30G, the first relay lens 23 and the second relay lens 25 are configured to perform correction so that the blue light is focused on the liquid crystal display device 32 in the liquid crystal display unit 30B.

The fourth turning mirror 26 is a total reflection mirror that reflects light from the second relay lens 25 and changes its direction by 90°, and is provided at a 45° tilt in a direction perpendicular to a light path of blue light from the second relay lens 25. Accordingly, the fourth turning mirror 26 reflects the blue light from the second relay lens 25 toward the third field lens 23B. The third field lens 23B is a converging lens, and outputs the blue light reflected by the fourth turning mirror 26 toward the liquid crystal display unit 30B and also converges the blue light on the liquid crystal display device 32 in the liquid crystal display unit 30B. A configuration of the liquid crystal display unit 30B will be described later.

The color synthesizing prism 40 is disposed in a position at which respective light paths of red, green, and blue light outputted from the liquid crystal display units 30R, 30G, and 30B intersect. The color synthesizing prism 40 synthesizes the incident red, green, and blue light and outputs the light from its output surface 40T.

The projection lens unit 41 enlarges and projects synthetic light outputted from the output surface 40T of the color synthesizing prism 40 onto a projection surface, such as a screen.

(Configuration of the Liquid Crystal Display Units 30R, 30G, and 30B)

The liquid crystal display units 30R, 30G, and 30B are a light modulator (a spatial modulator) that modulates illumination light from the illumination optical system 20 and outputs the modulated light. Respective pieces of color light (red, green, and blue light) outputted from the liquid crystal display units 30R, 30G, and 30B are outputted to the color synthesizing prism 40. The liquid crystal display units 30R, 30G, and 30B are, for example, a transmissive liquid crystal display unit, such as an HTPS (high temperature polysilicon). However, although not specifically illustrated, the liquid crystal display units 30R, 30G, and 30B may also be, for example, a reflective liquid crystal display unit, such as an LCOS (liquid crystal on silicon).

FIG. 2 schematically illustrates a configuration example of the liquid crystal display units 30R, 30G, and 30B. The liquid crystal display units 30R, 30G, and 30B include the liquid crystal display device 32 between a pair of polarizers (a first polarizer 31 and a second polarizer 34). The liquid crystal display unit 30R generates red image light, for example, by modulating incident red light (a wavelength of 600 nm or more but not exceeding 700 nm). The liquid crystal display unit 30G generates green image light, for example, by modulating incident green light (a wavelength of 500 nm or more but not exceeding 600 nm). The liquid crystal display unit 30B generates blue image light, for example, by modulating incident blue light (a wavelength of 430 nm or more but not exceeding 500 nm).

In the present embodiment, in each of these liquid crystal display units 30R, 30G, and 30B, an optical compensator 33 is provided between, of the first and second polarizers 31 and 34, at least one of the polarizers and the liquid crystal display device 32. The liquid crystal display device 32 is sealed by means of a pair of substrates 32A and 32B. Here, as an example, the optical compensator 33 is provided between the second polarizer 34 and, of the pair of substrates that seal the liquid crystal display device 32, one of the substrates (the light-output-side substrate 32B). In the liquid crystal display units 30R, 30G, and 30B, the first and second polarizers 31 and 34 may be attached to the substrates 32A and 32B; however, it is desirable that they be provided as members separated from the substrates 32A and 32B. This is, because in general, in a liquid crystal projector, the temperature of a polarizer is likely to increase as the polarizer absorbs light thereby generating heat, to suppress the transfer of this heat to the liquid crystal display device 32. On the other hand, the optical compensator 33 hardly absorbs light; therefore, the optical compensator 33 may be attached to the substrate 32B, or the optical compensator 33 and the substrate 32B may be provided as members separated from each other. It is to be noted that the "optical compensator 33" in the present embodiment corresponds to a specific example of an "optical compensation device" in the present disclosure.

The first and second polarizers 31 and 34 are, for example, that one of them selectively transmits a first polarized component (an s polarized component or a p polarized component), and the other polarizer transmits a second polarized component (the p polarized component or the s polarized component).

The liquid crystal display device 32 includes a liquid crystal layer between a pair of electrodes, and the light transmittance of the liquid crystal display device 32 is modulated when a drive voltage is applied to the liquid crystal layer through the pair of electrodes. In this liquid crystal layer of the liquid crystal display device 32, for example, vertical alignment (VA) mode liquid crystal is used. In the VA mode liquid crystal layer, to enhance response characteristics to the applied voltage, a liquid crystal molecule is given a so-called pretilt. It is to be noted that in the liquid crystal layer, other drive mode liquid crystal, for example, TN (twisted nematic) mode, ECB (electrically controlled birefringence) mode, FFS (fringe field switching) mode, IPS (in-plane switching) mode, etc. may be used.

The optical compensator 33 is an optical device that compensates residual retardation of the liquid crystal display device 32 described above. For example, in the liquid crystal layer of the liquid crystal display device 32, depending on the pretilt or interface alignment state, etc. of the liquid crystal molecule, a phase difference (residual retardation) occurs, which changes the transmittance. In particular, in VA mode liquid crystal, residual retardation when a black screen is displayed causes light to be slightly transmitted, which leads to a decrease in contrast. The retardation of the optical compensator 33 is set to a value that counteracts this residual retardation.

FIG. 3 illustrates a configuration example of the optical compensator 33. The optical compensator 33 includes, for example, a layered structure 332 on a substrate 331. The substrate 331 includes, for example, glass, such as borosilicate glass. An optical axis Zc of this optical compensator 33 is set at a tilt from a perpendicular direction (a direction perpendicular to a substrate surface) of the substrate 331 on the basis of a configuration of the layered structure 332 to be described later. As an example, in a case where the liquid crystal display device 32 uses VA mode liquid crystal, the direction (tilt direction) of the optical axis Zc of the optical compensator 33 is set along a pretilt direction (a longitudinal direction) of the liquid crystal molecule of the liquid crystal display device 32. It is to be noted that the optical axis Zc of the optical compensator 33 is defined as an Nz axis of an index ellipsoid as illustrated in FIGS. 4A and 4B. This optical compensator 33 serves as a so-called negative C-plate. In other words, a relation of Nx=Ny>Nz holds true for an index ellipsoid.

FIG. 5 illustrates a detailed configuration example of the layered structure 332. As seen from the drawing, the layered structure 332 has, for example, an underlayer 332A and a multilayered film 332B. The multilayered film 332B is formed on the underlayer 332A.

The underlayer 332A has a plurality of structures 332A1 arranged in two dimensions. The plurality of structures 332A1 each include first and second surfaces S1 and S2 having different inclination angles (inclination angles e11 and e12) from each other. In this example, the inclination angle e11 of the first surface S1 is smaller than the inclination angle e12 of the second surface S2 (e11<e12). The plurality of structures 332A1 each have a polyhedron including the first and second surfaces S1 and S2 or a curved surface. In the example of FIG. 5, the structures 332A1 each have a polyhedron, and the underlayer 332A has, for example, a serrated cross-sectional shape. Constituent materials of this underlayer 332A include an inorganic insulating material, for example, of constituent materials of refractive index films 332b1 and 332b2 to be described later, a material having high adhesion to the substrate 331.

The array pitch (the pitch) A of the plurality of structures 332A1 is set to be smaller than a wavelength of visible light. Specifically, the array pitch A is set to be smaller than any of wavelengths incident on the liquid crystal display units 30R, 30G, and 30B. The array pitch A is, for example, less than the incident wavelength (for example, 430 nm) of the liquid crystal display unit 30B that is the shortest wavelength. However, the array pitch A is desirably 380 nm or less, more desirably 300 nm or less, further more desirably 250 nm or less. As described in detail later, this is because the influence of diffraction on the optical compensator 33 is further suppressed as the array pitch A is smaller, which makes it possible to reduce light loss.

The multilayered film 332B serves, for example, as a negative C-plate, and includes the plurality of refractive index films 332b1 and 332b2 (first refractive index films and second refractive index films) that are alternately stacked one on top of another repeatedly. The film thickness of each of the refractive index films 332b1 and 332b2 is, for example, 10 nm or more but not exceeding 50 nm, and the respective numbers of layers of the refractive index films 332b1 and 332b2 are, for example, 10 or more but not exceeding 200. These refractive index films 332b1 and 332b2 include, for example, an inorganic insulating material. As the inorganic insulating material, for example, silicon oxide ($SiO_x$), silicon nitride (SiN), silicon oxynitride (SiON), aluminum oxide ($Al_2O_3$), titanium oxide ($TiO_2$), tantalum oxide ($Ta_2O_5$), niobium oxide ($Nb_2O_5$), etc. are used.

In this multilayered film 332B, a film thickness t1 in a region D1 facing the first surface S1 of the structure 332A1 and a film thickness t2 in a region D2 facing the second surface S2 are different from each other. Specifically, the film thickness t1 in the region D1 is larger than the film thickness t2 in the region D2. The film thicknesses t1 and t2 correspond to a total film thickness of the plurality of refractive index films 332b1 and 332b2 that are stacked one on top of another in the regions D1 and D2, respectively. The individual film thicknesses of the refractive index films 332b1 and 332b2 in the multilayered film 332B may be the same as described above, or may be different from one another. However, it is desirable that the ratio between respective film thicknesses of the refractive index films 332b1 and 332b2 be 1:1. This is because, this makes it possible to reduce the refractive index Nz of the index ellipsoid and to efficiently find a retardation value as described below.

That is, Nx, Ny, and Nz of the index ellipsoid are expressed in the following Equations (1) and (2), provided $n_1$ denotes the refractive index of the refractive index films 332b1, $t_{11}$ denotes the per-layer film thickness of the refractive index films 332b1, $n_2$ denotes the refractive index of the refractive index films 332b2, and $t_{12}$ denotes the per-layer film thickness of the refractive index films 332b2. Accordingly, a retardation value Rth in a thickness direction may be expressed in Equation (3). In these Equations (1) to (3), when the film thickness of the refractive index films 332b1 and the film thickness of the refractive index films 332b2 are at a ratio of 1:1, a difference between Nx and Nz reaches a maximum, and a value of Rth also reaches a maximum.

[Equation 1]

$$Nx = Ny = \sqrt{\left(\frac{t11}{t11+t12}\right)n_1^2 + \left(\frac{t12}{t11+t12}\right)n_2^2} \quad (1)$$

$$Nz = \sqrt{\left(\frac{t11}{t11+t12}\right)\frac{1}{n_1^2} + \left(\frac{t12}{t11+t12}\right)\frac{1}{n_2^2}} \quad (2)$$

$$Rth = \left(\frac{Nx+Ny}{2} - Nz\right)t1 \quad (3)$$

[Method of Producing the Optical Compensator 33]

FIG. 6 illustrates the flow of how to produce the above-described optical compensator 33. FIGS. 7A, 7B, 7C, 7D, 7E, and 7F are schematic cross-sectional views illustrating how to produce the optical compensator 33 in order of steps.

First, the substrate 331 including, for example, borosilicate glass is prepared (Step S11, FIG. 7A), following which the underlayer 332A including, for example, SiO is formed on this substrate 331, for example, by a CVD (chemical vapor deposition) method or the like (Step S12, FIG. 7B). Following the formation, a photoresist film 150 is formed on the underlayer 332A (Step S13, FIG. 7C). Thereafter, the photoresist film 150 is exposed to light, for example, by using a halftone mask (Step S14, FIG. 7D), following which anisotropic etching is performed (Step S15) to remove the photoresist film 150. Accordingly, it is possible to form the plurality of structures 332A1 each including the first and second surfaces S1 and S2 on the underlayer 332A as illustrated in FIG. 7E.

Thereafter, the multilayered film 332B is formed on the underlayer 332A (Step S16, FIG. 7F). Specifically, the refractive index films 332b1 including, for example, SiO and the refractive index films 332b2 including, for example, SiN are sequentially formed in alternate multiple layers, for example, by the CVD method and by a sputtering method or the like, respectively. Accordingly, it is possible to form the multilayered film 332B as a negative C-plate. Furthermore, by sequentially forming the refractive index films 332b1 and 332b2 on the underlayer 332A, the refractive index films 332b1 and 332b2 are deposited along the shape of the structures 332A1 of the underlayer 332A. In other words, the refractive index films 332b1 and 332b2 are deposited while keeping their inclined surfaces corresponding to respective inclination angles of the first and second surfaces S1 and S2 of the structures 332A1. Furthermore, depending on the respective inclination angles of the first and second surfaces S1 and S2, the thickness of the multilayered film 332B differs between a region facing the first surface S1 and a region facing the second surface S2. The optical compensator 33 may be produced as described above.

[Workings and Effects]

In this projection display apparatus 1, when light (for example, white light) emitted from the light source 11 has entered the illumination optical system 20, while the light is shaped into illumination light, light paths of R, G, and B light are separated, and the pieces of R, G, and B light are led to the liquid crystal display units 30R, 30G, and 30B, respectively. Respective pieces of color light are separated, for example, in such a manner that in the first dichroic mirror 20, red light is reflected, and green light and blue light are transmitted through the first dichroic mirror 20; in the second dichroic mirror 21, the green light is reflected, and the blue light is transmitted through the second dichroic mirror 21. Accordingly, the red light enters the liquid crystal display unit 30R through the first dichroic mirror 20, the second turning mirror 22, and the first field lens 23R. The green light is transmitted through the first dichroic mirror 20, and is reflected by the second dichroic mirror 21, and thereafter passes through the second field lens 23G and enters the liquid crystal display unit 30G. The blue light is transmitted through the first dichroic mirror 20 and the second dichroic mirror 21, and thereafter enters the liquid crystal display unit 30B through the first relay lens 23, the third turning mirror 24, the second relay lens 25, the fourth turning mirror 26, and the third field lens 23B.

In each of the liquid crystal display units 30R, 30G, and 30B, incident light is modulated (an image is generated) on the basis of an image signal for their corresponding color, and this modulated color light is outputted toward the color synthesizing prism 40. The respective pieces of modulated color light are synthesized by the color synthesizing prism 40, and the synthesized light enters the projection lens unit 41. The light (the image) having entered the projection lens unit 41 is, for example, enlarged and displayed on a projection surface such as, for example, a screen.

In the projection display apparatus 1 using such liquid crystal display units 30R, 30G, and 30B, depending on the pretilt or interface alignment state, etc. of the liquid crystal molecule, a phase difference (residual retardation) occurs in the liquid crystal layer of the liquid crystal display device 32, which changes the transmittance. In particular, in VA mode liquid crystal, due to the pretilt of the liquid crystal molecule, residual retardation when the black screen is displayed causes light to be slightly transmitted. This leads to a decrease in contrast.

Accordingly, there are proposed various optical compensators that compensate this residual retardation of a liquid crystal layer. FIG. 8A illustrates a configuration of an optical compensator 100 according to a comparative example (Comparative Example 1) of the present embodiment. As with the present embodiment, the optical compensator 100 has a dielectric multilayer film, and serves as a negative C-plate. This optical compensator 100 includes a multilayered film 102 on a substrate 101. The multilayered film 102 is a plurality of refractive index films 102a and 102b that are alternately stacked one on top of another repeatedly. As seen from the drawing, in the optical compensator 100 of Comparative Example 1, the multilayered film 102 is formed on the flat substrate 101, and its optical axis Zc is along a perpendicular direction (a direction perpendicular to an in-plane direction of the substrate 101) of the substrate 101. As illustrated in FIG. 8B, this optical axis Zc of the optical compensator 100 is disposed at a tilt to a liquid crystal layer 103, which makes it possible to compensate residual retardation of the liquid crystal layer 103. Specifically, the optical compensator 100 is installed at a tilt physically so that the optical axis Zc of the optical compensator 100 is disposed along a direction substantially parallel to a longitudinal direction Zp of a liquid crystal molecule 103a (a direction depending on a pretilt angle of the liquid crystal molecule 103a). However, this optical compensator 100 of Comparative Example 1 requires a mechanism or space for tilting the optical compensator 100.

Furthermore, besides this, there is an optical compensator adopting a prism shape (for example, above-mentioned PTL 4). By adopting the prism shape, it becomes possible to tilt only the optical axis Zc without tilting the optical compensator itself as with Comparative Example 1.

However, in a case where the optical compensator adopts the prism shape, there is light loss (diffraction or scattering) due to the prism shape, which leads to a decrease in transmittance and a decrease in contrast.

On the other hand, in the present embodiment, the optical compensator 33 has the underlayer 332A including the plurality of structures 332A1 as illustrated in FIG. 9A. The structures 332A1 each include the first and second surfaces S1 and S2 having different inclination angles from each other. In the optical compensator 33, the multilayered film 332B including the plurality of refractive index films 332b1 and 332b2 that are alternately stacked one on top of another repeatedly is formed on this underlayer 332A.

Accordingly, as illustrated in FIG. 9B, the optical compensator 33 optically serves as a negative C-plate with the optical axis Zc tilted. The optical axis Zc of the optical compensator 33 is disposed along a direction substantially parallel to the longitudinal direction Zp of a liquid crystal molecule 32a (a direction depending on a pretilt angle of the liquid crystal molecule 103a). By using this optical compensator 33, it becomes possible to compensate residual retardation of the liquid crystal display device 32. Furthermore, as the array pitch A of the plurality of structures 332A1 in the underlayer 332A beneath the multilayered film 332B is smaller than the wavelength of visible light, the influence of diffraction on the optical compensator 33 is suppressed, and light loss is reduced.

Furthermore, in the present embodiment, the refractive index films 332b1 and 332b2 included in the multilayered film 332B include an inorganic insulating material; therefore, as compared with a case in which refractive index films include an organic material such as, for example, liquid crystal polymer (above-mentioned PTL 1), material degradation due to heat and light is less likely to occur. Accordingly, it is possible to achieve the liquid crystal display units 30R, 30G, and 30B and the projection display apparatus 1 that do not require parts replacement (are maintenance free) even after long time use.

Moreover, in the present embodiment, it is possible to dispose the optical axis Zc at a tilt without physically tilting the optical compensator 33 itself as illustrated in FIG. 9B; therefore, as compared with Comparative Example 1, it is possible to achieve saving in space and a simplified configuration. Furthermore, this makes it possible to achieve cost reduction.

As described above, in the present embodiment, in each of the liquid crystal display units 30R, 30G, and 30B, the optical compensator 33 has the underlayer 332A including the plurality of structures 332A1, and the structures 332A1 each include the first and second surfaces S1 and S2 having different inclination angles (e11 and e12) from each other. In the optical compensator 33, the multilayered film 332B including the plurality of refractive index films 332b1 and 332b2 is formed on the underlayer 332A; therefore, it is possible to achieve the function of a negative C-plate with the optical axis Zc tilted and to compensate residual retardation of the liquid crystal display device 32. Furthermore, the array pitch A of the plurality of structures 332A1 in the underlayer 332A is smaller than the wavelength of visible light; therefore, it is possible to reduce light loss due to the influence of diffraction on the optical compensator 33. Consequently, it is possible to achieve high luminance and a high contrast ratio.

Another embodiment and modification examples of the present disclosure are described below. It is to be noted that a component similar to the one in the above first embodiment is assigned the same reference numeral, and description of the component is omitted accordingly.

Second Embodiment

[Configuration]

FIG. 10 illustrates a configuration example of a liquid crystal display unit according to a second embodiment of the present disclosure. This liquid crystal display unit corresponds to any of the liquid crystal display units 30R, 30G, and 30B in the first embodiment, and is applicable to a projection display apparatus including similar components to those in the first embodiment (the light source 11, the illumination optical system 20, the color synthesizing prism 40, and the projection lens unit 41).

The liquid crystal display unit of the present embodiment is a light modulator (a spatial modulator) that modulates light outputted from the illumination optical system 20 and outputs the modulated light, as with the liquid crystal display units 30R, 30G, and 30B in the first embodiment. Furthermore, the liquid crystal display unit of the present embodiment includes a liquid crystal display device (a liquid crystal display device 35) between a pair of polarizers (the first polarizer 31 and the second polarizer 34).

However, in the present embodiment, unlike the first embodiment, an optical compensation device (an optical compensation layer 36) that compensates residual retardation of the liquid crystal display device 35 is provided between the liquid crystal display device 35 and, of a pair of substrates (a drive substrate 351 and a counter substrate 356) that seal the liquid crystal display device 35, at least one of the substrates.

FIG. 11 illustrates a configuration example of a main section that describes the optical compensation layer 36. It is to be noted that FIG. 11 illustrates only a region in the liquid crystal display device 35 corresponding to three pixels P. The liquid crystal display device 35 is sealed between the drive substrate 351 including a TFT 352, etc. and the counter substrate 356, and includes a liquid crystal layer 355 between a pair of electrodes (a pixel electrode 354a and a counter electrode 354b). In the present embodiment, the optical compensation layer 36 is provided between, of the drive substrate 351 and the counter substrate 356, one of the substrates and, of the pixel electrode 354a and the counter electrode 354b, one of the electrodes. In this example, the optical compensation layer 36 is provided between the counter substrate 356 and the counter electrode 354b. A lens 357 is provided on the counter substrate 356 for each pixel P. It is to be noted that the "optical compensation layer 36" in the present embodiment corresponds to a specific example of the "optical compensation device" in the present disclosure.

The drive substrate 351 includes, for example, a pixel circuit including wires such as signal lines and scanning lines, a storage capacitor, etc. that are not illustrated, besides the TFT 352.

The light transmittance of the liquid crystal display device 353 is modulated when a drive voltage is applied to the liquid crystal layer 355 through the pixel electrode 354a and the counter electrode 354b. For example, VA mode liquid crystal is used in the liquid crystal layer 355, as with the liquid crystal layer of the liquid crystal display device 32 in the first embodiment. Furthermore, besides this, other mode liquid crystal, for example, liquid crystal in TN mode, ECB mode, FFS mode, IPS mode, etc. may be used. It is to be noted that unillustrated alignment films are formed between the pixel electrode 354a and the liquid crystal layer 355 and between the counter electrode 354b and the liquid crystal layer 355.

The optical compensation layer 36 is an optical device that compensates residual retardation of the liquid crystal layer 355, as with the optical compensator 33 in the first embodiment. As described above, in the liquid crystal layer 355, depending on the pretilt, etc. of a liquid crystal molecule, a phase difference (residual retardation) occurs, which changes the transmittance. In particular, in VA mode liquid crystal, residual retardation when the black screen is displayed causes a decrease in contrast. The retardation of the optical compensation layer 36 is set to a value that counteracts this residual retardation of the liquid crystal layer 355.

As with the optical compensator 33 in the first embodiment, this optical compensation layer 36 has the function of a negative C-plate, and has the underlayer 332A and the multilayered film 332B, for example, in order from the side of the counter substrate 356. The multilayered film 332B is formed on the underlayer 332A. The optical axis Zc is set at a tilt from the direction perpendicular to the substrate surface. As an example, in a case where the liquid crystal layer 355 includes VA mode liquid crystal, the optical axis Zc of the optical compensation layer 36 is set along the pretilt direction (the longitudinal direction) of the liquid crystal molecule of the liquid crystal layer 355.

As with the first embodiment, the underlayer 332A has the plurality of structures 332A1. The plurality of structures 332A1 each include the first and second surfaces S1 and S2 having different inclination angles (inclination angles e11 and e12) from each other. Furthermore, the array pitch A of the structures 332A1 is set to be smaller than the wavelength of visible light. The array pitch A is, as an example, less than the incident wavelength (for example, 430 nm) of the liquid crystal display unit 30B that is the shortest wavelength. Moreover, the array pitch A is desirably 380 nm or less, more desirably 300 nm or less, further more desirably 250 nm or less. It is to be noted that FIG. 11 illustrates ten structures 332A1, in total, in one pixel P; however, the number of the structures 332A1 is not limited to this. In a case where the width (the pitch) of a pixel P is, for example, 3 μm or more but not exceeding 30 μm, for example, no less than ten and no more than hundred structures 332A1 may be provided depending on the array pitch A. In other words, it is possible to set the array pitch A to be sufficiently smaller than a pixel pitch. The same applies to the first embodiment.

The multilayered film 332B serves, for example, as a negative C-plate, and includes the plurality of refractive index films 332b1 and 332b2 that are alternately stacked one on top of another repeatedly. These refractive index films 332b1 and 332b2 include the above-described inorganic insulating material, such as silicon oxide. Furthermore, the film thickness of the multilayered film 332B differs between the region facing the first surface S1 of the structure 332A1 and the region facing the second surface S2.

However, the optical compensation layer 36 in the present embodiment has a planarizing layer 332C on a surface of the multilayered film 332B on the side of the counter electrode 354b. The planarizing layer 332C includes, for example, an inorganic insulating material equivalent to the refractive index films 332b1 and 332b2, and has, for example, a film thickness greater than a film thickness of each of the refractive index films 332b1 and 332b2. A surface of this planarizing layer 332C on the side of the multilayered film 332B has a concavo-convex shape depending on the shape of the structures 332A1, and a surface on the side of the counter electrode 354b is flat.

The counter substrate 356 includes, for example, a light-transmissive inorganic insulating material, such as glass. The lenses 357 are provided to converge light on a pixel aperture, thereby suppressing light loss in the wires and the pixel circuit that are disposed on the drive substrate 351 and improving light use efficiency.

FIG. 12 illustrates the flow of how to form the above-described optical compensation layer 36. FIGS. 13A, 13B, 13C, 13D, 13E, 13F, 13G, 13H, and 13I are schematic cross-sectional views illustrating a process of forming the optical compensation layer 36 in order of steps.

First, the counter substrate 356 is prepared as a substrate for forming the optical compensation layer 36 (Step S21, FIG. 13A), following which the underlayer 332A including, for example, SiO is formed on this counter substrate 356, for example, by the CVD method or the like (Step S22, FIG. 13B). Following the formation, the photoresist film 150 is formed on the underlayer 332A (Step S23, FIG. 13C). Thereafter, the photoresist film 150 is exposed to light, for example, by using a halftone mask (Step S24, FIG. 13D), following which anisotropic etching is performed (Step S25) to remove the photoresist film 150. Accordingly, it is possible to form the plurality of structures 332A1 each including the first and second surfaces S1 and S2 on the underlayer 332A as illustrated in FIG. 13E.

Thereafter, the multilayered film 332B is formed on the underlayer 332A (Step S26, FIG. 13F). Specifically, as with the first embodiment, the refractive index films 332b1 including, for example, SiO and the refractive index films 332b2 including, for example, SiN are sequentially formed in alternate multiple layers, for example, by the CVD method and by the sputtering method or the like, respectively. Accordingly, it is possible to form the multilayered film 332B as a negative C-plate.

Following the formation, the planarizing layer 332C is formed on the multilayered film 332B (Step S27, FIG. 13G). Specifically, the planarizing layer 332C including, for example, SiO is formed to have, for example, a thickness greater than that of the multilayered film 332B, for example, by the CVD method. Thereafter, the surface of the formed planarizing layer 332C is polished, for example, by a CMP (chemical mechanical polishing) method to planarize the surface (Step S28, FIG. 13H). In this way, it is possible to form the optical compensation layer 36 on the counter substrate 356.

The counter electrode 354b including, for example, ITO (indium tin oxide) or the like is formed on the planarizing layer 332C of the optical compensation layer 36, for example, by the sputtering method or the like (Step S29, FIG. 13I). As described above, it is possible to form the optical compensation layer 36 and the counter electrode 354b on the counter substrate 356 in this order.

[Workings and Effects]

Also in the liquid crystal display unit of the present embodiment, as described in the above first embodiment, depending on the pretilt, etc. of the liquid crystal molecule, a phase difference (residual retardation) occurs in the liquid crystal layer 355 of the liquid crystal display device 35. In particular, in VA mode liquid crystal, residual retardation when the black screen is displayed causes light to be slightly transmitted, which leads to a decrease in contrast.

As described above, this residual retardation is able to be compensated by disposing the optical axis of the negative C-plate at a tilt. Here, FIG. 14 illustrates a liquid crystal panel 104 including an optical compensation layer 1046 according to a comparative example (Comparative Example 2) of the present embodiment. This liquid crystal panel 104 includes, for example, a liquid crystal display device 1043, the optical compensation layer 1046, a counter substrate 1047, and a lens 1048 in this order on a drive substrate 1041 including a TFT 1042, etc. The liquid crystal display device 1043 is sealed between the drive substrate 1041 and the counter substrate 1047, and includes a liquid crystal layer 1045 between a pixel electrode 1044a and a counter electrode 1044b.

In this liquid crystal panel 104 of Comparative Example 2, the optical compensation layer 1046 is provided with a plurality of prism shapes 1046A. One prism shape 1046A is disposed, for example, per pixel P, and includes, for example, an inclined surface S100. By adopting the prism shapes 1046A, it becomes possible to dispose the optical axis Zc of the optical compensation layer 1046 at a tilt. However, in a case where the optical compensation layer 1046 adopts the prism shapes 1046A, there is light loss (diffraction or scattering) due to the prism shapes 1046A, which causes a decrease in transmittance and a decrease in contrast as a result.

In contrast, in the present embodiment, as illustrated in FIG. 11, the optical compensation layer 36 provided between the counter electrode 354b of the liquid crystal display device 35 and the counter substrate 356 has the underlayer 332A including the plurality of structures 332A1. The structures 332A1 each include the first and second surfaces S1 and S2 having different inclination angles from each other. In the optical compensation layer 36, the multilayered film 332B including the plurality of refractive index films 332b1 and 332b2 that are alternately stacked one on top of another repeatedly is formed on this underlayer 332A. Accordingly, as with the first embodiment, the optical compensation layer 36 optically serves as a negative C-plate with the optical axis Zc tilted. Therefore, it is possible to compensate residual retardation of the liquid crystal layer 355. Furthermore, as the array pitch A of the plurality of structures 332A1 in the underlayer 332A is smaller than the wavelength of visible light, the influence of diffraction on the optical compensation layer 36 is suppressed, and light loss is reduced as compared with Comparative Example 2 described above.

As described above, in the liquid crystal display unit of the present embodiment, the optical compensation layer 36 has the underlayer 332A including the plurality of structures 332A1, and the structures 332A1 each include the first and second surfaces S1 and S2 having different inclination angles from each other. In the optical compensation layer 36, the multilayered film 332B including the plurality of refractive index films 332b1 and 332b2 is formed on the underlayer 332A; therefore, it is possible to achieve the function of a negative C-plate with the optical axis Zc tilted and to compensate residual retardation of the liquid crystal display device 35. Furthermore, the array pitch A of the plurality of structures 332A1 in the underlayer 332A is smaller than the wavelength of visible light; therefore, it is possible to reduce light loss due to the influence of diffraction on the optical compensation layer 36. Consequently, it is possible to achieve high luminance and a high contrast ratio. as with the first embodiment.

EXAMPLES

Subsequently, respective examples (Examples 1 and 2) of the optical compensator 33 in the first embodiment and the optical compensation layer 36 in the second embodiment are described.

Example 1

FIG. 15 illustrates a configuration example of a main section of the optical compensator 33 in the first embodiment. FIG. 16 illustrates an example of design values of the optical compensator 33 illustrated in FIG. 15. As illustrated in FIG. 15, the array pitch of the structures 332A1 is denoted by A; the height by B; the inclination angle of the first surface S1 by e11; the inclination angle of the second surface S2 by e12; the length of the base facing the first surface S1 by C1; and the length of the base facing the second surface S2 by C2. Furthermore, the film thickness of the multilayered film 332B in the region D1 is denoted by t1; the film thickness in the region D2 by t2; and the film thickness in the direction perpendicular to the substrate surface by t. These values may be set, for example, as illustrated in FIG. 16. That is, the array pitch A is 300 nm; the height B of the structures 332A1 is 150 nm; the length C1 of the base is 250 nm; C2 is 50 nm; the inclination angle e11 is 36.9°; the inclination angle e12 is 56.3°; the film thickness t is 4800 nm; the film thickness t1 is 3840 nm; and the film thickness t2 is 2663 nm.

It is to be noted that a transmissive liquid crystal display unit (HTPS) was used for the liquid crystal display device 32. VA mode liquid crystal was used in a liquid crystal layer, and the pretilt angle of the liquid crystal layer was 85° (a horizontal direction along the substrate surface is 0°); the birefringence index (refractive index anisotropy) was 0.13; and the thickness was 2.7 μm. Furthermore, borosilicate glass was used as a constituent material of the substrate 331 of the optical compensator 33; SiO was used in the refractive index films 332b1 of the multilayered film 332B; and SiN was used in the refractive index films 332b2. The film thickness (the film thickness in the direction perpendicular to the substrate surface) of each of the refractive index films 332b1 and 332b2 was 30 nm; and the respective numbers of layers of the refractive index films 332b1 and 332b2 were 80 layers (a total of 160 layers). The value of retardation Rth in the thickness direction in this design was 280 nm.

FIG. 17A illustrates a relationship between the array pitch A (nm) of the structures 332A1 of the optical compensator 33 and diffracted and scattered light of incident light. As seen from the drawing, in the array pitch A of less than the wavelength of visible light, loss of light due to diffraction and scattering tends to decrease; in particular, in 300 nm or less, the influence of diffraction and scattering drastically decreases, and in 250 nm or less, it is possible to decrease the loss to substantially 0%. FIG. 17B illustrates a relationship between the array pitch A (nm) and loss of light use efficiency.

Example 2

FIG. 18 illustrates a configuration example of a main section of the optical compensation layer 36 in the second embodiment. FIG. 19 illustrates an example of design values of the optical compensation layer 36 illustrated in FIG. 18. As illustrated in FIG. 18, the array pitch of the structures 332A1 is denoted by A; the height by B; the inclination angle of the first surface S1 by e11; the inclination angle of the second surface S2 by e12; the length of the base facing the first surface S1 by C1; and the length of the base facing the second surface S2 by C2. Furthermore, the film thickness of the multilayered film 332B in the region D1 is denoted by t1; the film thickness in the region D2 by t2; and the film thickness in the direction perpendicular to the substrate surface by t. These values may be set, for example, as illustrated in FIG. 19. That is, the array pitch A is 300 nm; the height B of the structures 332A1 is 150 nm; the length C1 of the base is 250 nm; C2 is 50 nm; the inclination angle e11 is 31.0°; the inclination angle e12 is 71.6°; the film thickness t is 3600 nm; the film thickness t1 is 3087 nm; and the film thickness t2 is 1138 nm.

It is to be noted that a transmissive liquid crystal display unit (HTPS) was used for the liquid crystal display device 35. VA mode liquid crystal was used in the liquid crystal layer 355, and the pretilt angle of the liquid crystal layer was 85° (a horizontal direction along the substrate surface is 0°); the birefringence index (refractive index anisotropy) was 0.13; and the thickness was 2.7 μm. Furthermore, the multilayered film 332B was formed on the counter substrate; SiO was used in the refractive index films 332b1; and SiN was used in the refractive index films 332b2. The film thickness (the film thickness in the direction perpendicular to the substrate surface) of each of the refractive index films 332b1 and 332b2 was 30 nm; and the respective numbers of layers of the refractive index films 332b1 and 332b2 were 60 layers (a total of 120 layers). The value of retardation Rth in the thickness direction in this design was 212 nm.

Modification Examples 1-1 to 1-4

FIG. 20A is a schematic diagram that describes an optical compensator according to Modification Example 1-1. FIG. 20B is a schematic diagram that describes an optical compensator according to Modification Example 1-2. FIG. 20C is a schematic diagram that describes an optical compensator according to Modification Example 1-3. FIG. 20D is a schematic diagram that describes an optical compensator according to Modification Example 1-4. It is to be noted that here, examples of a configuration of an optical compensator having the underlayer 332A on the substrate 331 as with the first embodiment are described; however, respective configurations of the underlayer 332A of the present modification examples are applicable to an optical compensation layer similar to that in the second embodiment.

In the underlayer 332A in any of Modification Examples 1-1 to 1-4, as with the first embodiment, the structures 332A1 include the first and second surfaces S1 and S2 having different inclination angles (e11 and e12) from each other. Furthermore, the underlayer 332A has a roughly serrated cross-sectional shape. However, the configurations of the underlayer 332A in Modification Examples 1-1 to 1-4 differ from the underlayer 332A of the first embodiment in the following points.

In the underlayer 332A in Modification Example 1-1, the second surface S2 is a surface perpendicular to the substrate surface (the inclination angle e12 is 90°) as illustrated in FIG. 20A. In this way, one of the inclination angles e11 and e12 may be 90°.

The underlayer 332A in Modification Example 1-2 has a surface (a third surface S3) other than the first and second surfaces S1 and S2 as illustrated in FIG. 20B. In this example, the underlayer 332A is trapezoidal in cross-sectional shape. In this way, as long as the underlayer 332A is a polyhedron including at least the first and second surfaces S1 and S2, the underlayer 332A may have a surface other than the first and second surfaces S1 and S2.

In the underlayer 332A in Modification Example 1-3, the structures 332A1 have a curved surface as illustrated in FIG. 20C. The cross-sectional shape of the structures 332A1 is, for example, a shape that the cross-sectional shape (a triangular shape) of the structures 332A1 in the first embodiment is rounded. The curved surface of each of the structures 332A1 may be considered as a polyhedron (approximate to a polyhedron) including the first surface S1 having the inclination angle e11 and the second surface S2 having the inclination angle e12. For example, it may be considered as a structure having two planes (the first surface S1 and the second surface S2) with a vertex h of the structure 332A1 as a border. In this way, the structures 332A1 may have a curved surface approximate to the first surface S1 and the second surface S2.

In the underlayer 332A in Modification Example 1-4, the plurality of structures 332A1 are discretely arranged as illustrated in FIG. 20D. That is, there is a gap D3 between the structures 332A1. In this way, in the underlayer 332A, the plurality of structures 332A1 may be tightly arranged as with the first embodiment, or may be discretely arranged as with the present modification example.

It is to be noted that in the underlayer 332A, the structures 332A1 may be arranged to run in parallel along one direction in the substrate surface (a Y direction), for example, as schematically illustrated in FIG. 21A. Alternatively, the plurality of structures 332A1 may be arranged in a matrix along an X direction and the Y direction as schematically illustrated in FIG. 21B.

Other Modification Examples

Furthermore, for example, as schematically illustrated in FIG. 22, the optical compensator 33 (the optical compensation layer 36) may have a plurality of regions (here, two regions F1 and F2) that differ in direction of the optical axis (the optical axis Zc of the negative C-plate) from each other. These regions F1 and F2 have optical axes Zc1 and Zc2 tilted in different directions from each other, respectively. For example, in a case where the liquid crystal layer of the liquid crystal display device 32 (the liquid crystal display device 35) includes a plurality of regions having different alignment directions with an alignment division (multi-domain) technology, it is desirable that the direction of the optical axis Zc (the tilt direction) be changed depending on the alignment direction for each region of this liquid crystal layer.

The embodiments and their modification examples are described above; however, the present disclosure is not limited to the above embodiments, etc., and it is possible to make various modification. For example, respective materials, shapes, sizes, etc. of the components described in the above embodiments, etc. are merely an example, and are not limited to those described above.

Furthermore, in the above embodiments, etc., there is provided an example of a configuration in which an optical compensation device is disposed in one spot (between, one of a pair of polarizers and a liquid crystal display device); however, optical compensation devices may be disposed in several spots. For example, optical compensation devices may be disposed in a total of two spots: between the liquid crystal display device and one of the pair of polarizers and between the liquid crystal display device and the other polarizer. Furthermore, in a case where optical compensation devices are disposed in several spots, both an optical compensation device disposed between the polarizer and a substrate (for example, the optical compensator 33 in the first embodiment) and an optical compensation device disposed between the substrate and an electrode (for example, the optical compensation layer 36 in the second embodiment) may be present.

It is to be noted that the effects described in this specification are examples, and the effects may be other effects or may further include other effects.

For example, the present disclosure may have the following configurations.

(1)
A liquid crystal display unit including:
a pair of polarizers;
a liquid crystal display device provided between the pair of polarizers; and
an optical compensation device provided between, of the pair of polarizers, at least one polarizer and the liquid crystal display device,
in which the optical compensation device includes
an underlayer including a plurality of structures that each include first and second surfaces having different inclination angles from each other, and
a multilayered film formed on the underlayer and including a plurality of first and second refractive index films that are alternately stacked one on top of another repeatedly, and
an array pitch of the plurality of structures in the underlayer is smaller than a wavelength of visible light.

(2)
The liquid crystal display unit according to (1), in which a film thickness of the multilayered film differs between a region facing the first surface and a region facing the second surface.

(3)
The liquid crystal display unit according to (1) or (2), in which the array pitch of the plurality of structures is 380 nm or less.

(4)
The liquid crystal display unit according to any one of (1) to (3), in which the array pitch of the plurality of structures is 300 nm or less.

(5)
The liquid crystal display unit according to any one of (1) to (4), in which the array pitch of the plurality of structures is 250 nm or less.

(6)
The liquid crystal display unit according to any one of (1) to (5), in which
the liquid crystal display device is sealed between a pair of substrates, and includes a liquid crystal layer between a pair of electrodes, and the optical compensation device is provided between one of the pair of substrates and one of the pair of polarizers.

(7)
The liquid crystal display unit according to any one of (1) to (6), in which
the liquid crystal display device is sealed between a pair of substrates, and includes a liquid crystal layer between a pair of electrodes, and
the optical compensation device is provided between one of the pair of substrates and one of the pair of electrodes.

(8)
The liquid crystal display unit according to (7), in which the optical compensation device includes a planarizing layer between the multilayered film and one of the pair of electrodes.

(9)
The liquid crystal display unit according to any one of (1) to (8), in which
the liquid crystal display device includes a liquid crystal layer including a vertical alignment type liquid crystal molecule, and
a direction of an optical axis of the optical compensation device is set along a pretilt direction of the liquid crystal molecule.

(10)
The liquid crystal display unit according to (9), in which the optical compensation device includes a plurality of regions that differ in the direction of the optical axis from one another.

(11)
The liquid crystal display unit according to any one of (1) to (10), in which the underlayer has a serrated cross-sectional shape.

(12)
The liquid crystal display unit according to any one of (1) to (11), in which the plurality of structures each have a polyhedron including the first and second surfaces or a curved surface.

(13)
The liquid crystal display unit according to any one of (1) to (12), further including a substrate on which the underlayer is formed,
in which the underlayer includes, of constituent materials of the first and second refractive index films, a material having high adhesion to the substrate.

(14)
The liquid crystal display unit according to any one of (1) to (13), in which a film thickness ratio of the first and second refractive index films is 1:1.

(15)
The liquid crystal display unit according to any one of (1) to (14), in which the first and second refractive index films each include an inorganic insulating material.

(16)
The liquid crystal display unit according to (15), in which the first and second refractive index films each include any of silicon oxide, silicon nitride, and silicon oxynitride.

(17)
The liquid crystal display unit according to any one of (1) to (16), in which the liquid crystal display unit is a transmissive liquid crystal display unit.

(18)
The liquid crystal display unit according to any one of (1) to (16), in which the liquid crystal display unit is a reflective liquid crystal display unit.

(19)
A projection display apparatus provided with a liquid crystal display unit, the liquid crystal display unit including:
a pair of polarizers;
a liquid crystal display device provided between the pair of polarizers; and
an optical compensation device provided between, of the pair of polarizers, at least one polarizer and the liquid crystal display device,
in which the optical compensation device includes
an underlayer including a plurality of structures that each include first and second surfaces having different inclination angles from each other, and
a multilayered film formed on the underlayer and including a plurality of first and second refractive index films that are alternately stacked one on top of another repeatedly, and
an array pitch of the plurality of structures in the underlayer is smaller than a wavelength of visible light.

(20)
An optical compensation device including:
an underlayer including a plurality of structures that each include first and second surfaces having different inclination angles from each other; and
a multilayered film formed on the underlayer and including a plurality of first and second refractive index films that are alternately stacked one on top of another repeatedly,
in which an array pitch of the plurality of structures in the underlayer is smaller than a wavelength of visible light.

This application claims for right of priority based on Japanese Patent Application No. 2016-167881 filed with the Japan Patent Office on Aug. 30, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A liquid crystal display unit, comprising:
a pair of polarizers;
a liquid crystal display device provided between the pair of polarizers; and
an optical compensation device provided between, of the pair of polarizers, at least one polarizer and the liquid crystal display device, wherein
the optical compensation device includes:
an underlayer including a plurality of structures that each include a first surface and a second surface having different inclination angles from each other, and
a multilayered film formed on the underlayer and including a plurality of first refractive index films and a plurality of second refractive index films that are alternately stacked one on top of another repeatedly, and
an array pitch of the plurality of structures in the underlayer is smaller than a wavelength of visible light.

2. The liquid crystal display unit according to claim 1, wherein a film thickness of the multilayered film differs between a region facing the first surface and a region facing the second surface.

3. The liquid crystal display unit according to claim 1, wherein the array pitch of the plurality of structures is 380 nm or less.

4. The liquid crystal display unit according to claim 1, wherein the array pitch of the plurality of structures is 300 nm or less.

5. The liquid crystal display unit according to claim 1, wherein the array pitch of the plurality of structures is 250 nm or less.

6. The liquid crystal display unit according to claim 1, wherein
the liquid crystal display device is sealed between a pair of substrates, and includes a liquid crystal layer between a pair of electrodes, and
the optical compensation device is provided between one of the pair of substrates and one of the pair of polarizers.

7. The liquid crystal display unit according to claim 1, wherein
the liquid crystal display device is sealed between a pair of substrates, and includes a liquid crystal layer between a pair of electrodes, and
the optical compensation device is provided between one of the pair of substrates and one of the pair of electrodes.

8. The liquid crystal display unit according to claim 7, wherein the optical compensation device further includes a planarizing layer between the multilayered film and the one of the pair of electrodes.

9. The liquid crystal display unit according to claim 1, wherein
the liquid crystal display device includes a liquid crystal layer including a vertical alignment type liquid crystal molecule, and
a direction of an optical axis of the optical compensation device is set along a pretilt direction of the vertical alignment type liquid crystal molecule.

10. The liquid crystal display unit according to claim 9, wherein the optical compensation device further includes a plurality of regions that differ in the direction of the optical axis from one another.

11. The liquid crystal display unit according to claim 1, wherein the underlayer has a serrated cross-sectional shape.

12. The liquid crystal display unit according to claim 1, wherein the plurality of structures each have a polyhedron including the first surface and the second surface or a curved surface.

13. The liquid crystal display unit according to claim 1, further comprising a substrate on which the underlayer is formed,
wherein the underlayer further includes, of constituent materials of the plurality of first refractive index films and the plurality of second refractive index films, a material having high adhesion to the substrate.

14. The liquid crystal display unit according to claim 1, wherein a film thickness ratio of the plurality of first refractive index films and the plurality of second refractive index films is 1:1.

15. The liquid crystal display unit according to claim 1, wherein the plurality of first refractive index films and the plurality of second refractive index films each include an inorganic insulating material.

16. The liquid crystal display unit according to claim 15, wherein the plurality of first refractive index films and the plurality of second refractive index films each include any of silicon oxide, silicon nitride, and silicon oxynitride.

17. The liquid crystal display unit according to claim 1, wherein the liquid crystal display unit is a transmissive liquid crystal display unit.

18. The liquid crystal display unit according to claim 1, wherein the liquid crystal display unit is a reflective liquid crystal display unit.

19. A projection display apparatus provided with a liquid crystal display unit, the liquid crystal display unit comprising:
a pair of polarizers;
a liquid crystal display device provided between the pair of polarizers; and
an optical compensation device provided between, of the pair of polarizers, at least one polarizer and the liquid crystal display device, wherein
the optical compensation device includes:
an underlayer including a plurality of structures that each include a first surface and a second surface having different inclination angles from each other, and
a multilayered film formed on the underlayer and including a plurality of first refractive index films and a plurality of second refractive index films that are alternately stacked one on top of another repeatedly, and
an array pitch of the plurality of structures in the underlayer is smaller than a wavelength of visible light.

20. An optical compensation device comprising:
an underlayer including a plurality of structures that each include a first surface and a second surface having different inclination angles from each other; and
a multilayered film formed on the underlayer and including a plurality of first refractive index films and a plurality of second refractive index films that are alternately stacked one on top of another repeatedly,
wherein an array pitch of the plurality of structures in the underlayer is smaller than a wavelength of visible light.

* * * * *